United States Patent [19]
Boyd et al.

[11] 4,333,708
[45] Jun. 8, 1982

[54] MECHANICALLY MULTISTABLE LIQUID CRYSTAL CELL

[75] Inventors: Gary D. Boyd, Rumson; Julian Cheng, Little Silver; Peter D. T. Ngo, Colts Neck, all of N.J.

[73] Assignee: Bell Telephone Laboratories, Incorporated, Murray Hill, N.J.

[21] Appl. No.: 98,976

[22] Filed: Nov. 30, 1979

[51] Int. Cl.³ .............................................. G02F 1/133
[52] U.S. Cl. .................................... 350/346; 350/340; 350/341; 350/334
[58] Field of Search ................ 350/341, 340, 334, 336, 350/346

[56] References Cited

U.S. PATENT DOCUMENTS

| | | | |
|---|---|---|---|
| 4,002,404 | 1/1977 | Dir ....................................... | 350/340 |
| 4,030,997 | 6/1977 | Miller et al. ...................... | 350/341 X |
| 4,128,313 | 12/1978 | Cole et al. ............................ | 350/340 |

OTHER PUBLICATIONS

Porte: "Surface Disclination Lines Observed in Nematic Liquid Crystals . . . " *Le Jrnl, De Physique,* May 1977, pp. 509–517.
Porte et al.: "A Phase Transition-Like Instability . . . ", *Le Jrnl. De Physique,* Feb. 1978, pp. 213–223.
Saito et al: "Field-Induced Distortion of the Molecular Orientation . . . ", *Jpn. J. Appl. Phys.,* 1979, pp. 1627–1628.
Bigelow: "Observations of a Bistable Twisted Nematic Liquid Crystal Effect," IEEE, Trans. on Elec. Devices, Sep., 1975 pp. 730–733.

*Primary Examiner*—Edward S. Bauer
*Attorney, Agent, or Firm*—Michael B. Einschlag; Daniel D. Dubosky

[57] ABSTRACT

A liquid crystal cell having memory is provided by disposing a liquid crystal material having nematic directors between two substrates which are fabricated to contain an array of singular points. The cell may further include means for detaching singularities such as appropriate electrode arrangements.

These substrate configurations provide multistable configurations of the director alignments because disclinations must be moved, either through the bulk of the liquid crystal material or on the substrate surfaces to switch between the stable configurations.

The switching of the device between stable configurations may be accomplished by the application of electrical fields to the liquid crystal material.

The stable configurations may be optically differentiated by the incorporation of pleochroic dyes into the liquid crystal material or by crossed polarizers.

27 Claims, 44 Drawing Figures

MECHANICALLY MULTISTABLE LIQUID CRYSTAL CELL

BACKGROUND OF THE INVENTION

This invention pertains to the field of liquid crystal displays, and more particularly to a liquid crystal cell that can be utilized in displays.

Present nematic liquid crystal displays are primarily field-effect devices which lack memory, and thereby suffer from stringent multiplexing limitations imposed by refresh requirements. A persistent electrooptic response requiring no sustaining voltage is desirable for large area display applications. Although memory effects have been discovered in smectic and cholesteric materials, these effects are mostly based on the thermodynamic metastability of ordered and disordered textures of the mesophase, and often require thermal transitions through an intermediate isotropic phase.

Purely electrically driven memory effects are rare, existing only in some special smectic materials associated with the generation of defects or electrohydrodynamic instabilities, and in rate-controlled electrical switching of positive cholesterics.

SUMMARY OF THE INVENTION

Devices fabricated in accordance with the present invention comprise a liquid crystal material disposed between two substrate materials, the liquid crystal material having orientational directors. Configurations of director alignment within a cell of the liquid crystal device which are mechanically stable with respect to each other are described mathematically by the existence of two or more different solutions of the equilibrium equation for the same physical boundary conditions on the boundary surface enclosing the cell. Mechanically stable liquid crystal configurations in a cell are achieved by providing appropriate boundary conditions on the surfaces of the substrates. The stable configurations provided thereby represent states of minimal elastic distortion subject to the boundary constraints. With appropriately chosen boundary conditions, multiple solutions exist which represent equilibrium states of local energy minima.

A mechanical liquid crystal bistability is distinguished from a thermodynamic liquid crystal bistability in that in a mechanical bistability the directors assume any of at least two different ordered stable configurations of equal or nearly equal energy in the same phase, whereas in a thermodynamic bistability the two different stable (or long-lived metastable) configurations result from the application of different thermal or electrical histories. The mechanical bistability of the present invention involves a transition between two ordered states of minimum energy separated by an energy barrier whereas a thermodynamic bistability involves an order-disorder transition. From a practical viewpoint, however, the mechanically bistable configurations must be separated by a sufficiently large energy barrier to prevent spurious thermally activated transitions to other configurations.

In accordance with the most general aspect of the present invention, bistable configurations are provided by using substrates whose surfaces contain an array of singular points or in the alternative, by combining substrates with means for generating singularities. A singular point may be broadly defined for the purposes of the present invention as a point on the substrate at which a director alignment ambiguity exists. The singular points provide that the switching from one mechanically stable configuration to another requires the movement of disclinations, either through the bulk of the liquid crystal or on the substrate surfaces. The singular points also serve as sources from which these disclinations are generated. Since the energy of the intermediate configurations, i.e., those configurations where disclinations are moving, is larger than that of the stable configurations, the need to move disclinations for switching provides the energy barrier between the configurations and results in stability.

In one embodiment, a substrate whose surface contains an array of singular points is provided by treating the surface so that there is an alternating tilt alignment for directors at the substrate surface. In accordance with this boundary condition the directors are aligned at angle $\theta$ with respect to a normal to the substrate surface in a first region of the substrate surface and at tilt angle $-\theta'$ in regions adjacent to the first region on the substrate surface; as shown in FIG. 7.

In another embodiment, a substrate whose surface contains an array of singular points is provided by shaping the substrate surface to have a triangular cross-section to provide singular points at the discontinuities of the triangular pattern.

In an embodiment combining substrates with means for generating and detaching singularities, the substrate surface is treated so that all directors in a region of the substrate surface are aligned at the same angle with respect to the substrate surface and means are provided for generating singularities. One such means is provided by interdigital electrodes appropriately spaced on the substrate, which electrodes also serve to provide a means for switching from one stable configuration to another.

"Vertical" and "horizontal" stable configurations are fabricated according to the present invention where a "vertical" stable director configuration is defined to have a large fraction of the directors in the bulk of the liquid crystal material substantially in the vertical direction, i.e., perpendicular to the plane of the substrates, and a "horizontal" stable director configuration has a large fraction of the directors in the bulk of the liquid crystal material substantially in the horizontal direction, i.e., parallel to the plane of the substrates. Optical differentiation between the "vertical" and "horizontal" stable configurations can be achieved by the incorporation of pleochroic dyes in the liquid crystal material or by the use of polarizers.

Switching between different stable configurations may be accomplished in some embodiments by the use of interdigital electrode arrangements that apply electric fields to the liquid crystal material in the vertical or transverse (with a component in the horizontal) directions.

In one embodiment, nematic materials that display a change in sign of the dielectric anisotropy $\Delta\epsilon = \epsilon_{\parallel} - \epsilon_{\perp}$ between low frequency fields ($<5$ k Hz) and high frequency fields ($>50$ k Hz) are utilized. Here, the application of the appropriate electric fields causes switching between "vertical" and "horizontal" stable configurations.

In one embodiment of the present invention all the mechanically bistable configurations are nonplanar. This is achieved by fabricating regions of director alignment as described hereinabove where the boundaries between regions are substantially parallel straight lines on both substrate surfaces. One of the substrates is now rotated relative to the other so that the lines on one surface are substantially nonparallel to the lines on the second surface. The resulting structure also provides a mechanical multiconfigurational stability because the movement of disclinations is required for switching. This provides an energy barrier between configurations and results in stability. In these embodiments providing nonplanar mechanically bistable configurations the liquid crystal material may include a small amount of material in the cholesteric phase in addition to the nematic material in order to remove twist ambiguities at the substrate surfaces.

BRIEF DESCRIPTION OF THE DRAWING

A complete understanding of the present invention may be gained from a consideration of the detailed description presented hereinbelow in connection with the accompanying drawings in which.

DETAILED DESCRIPTION

Devices fabricated in accordance with the present invention comprise a liquid crystal material disposed between two substrate materials. These devices exhibit mechanically stable configurations of alignment of the directors of the liquid crystal material.

We have discovered how to form liquid crystal cells in these devices which have mechanically stable configuraions of alignment of the orientational directors of the liquid crystal material. For the moment it is best to envision the liquid crystal cell to be a volume of liquid crystal material within the device which is bounded on the top by the surface of one of the two substrates and on the bottom by the surface of the other one of the two substrates. The sides of the volume comprises surrounding liquid crystal material. Hereinbelow we will describe how these individual cells are combined in devices but our invention, which specifically addresses the structure which provides for mechanically stable configurations, is best understood by considering the liquid crystal cell described hereinabove. Basically the aspect of the invention which provides the stable configurations addresses specific treatments of the substrate surfaces which bound the liquid crystal cell.

Configurations of director alignment which are mechanically stable with respect to each other are described mathematically by the existence of two different solutions of the equilibrium equation for the same physical boundary conditions. For example, a mechanically bistable liquid crystal cell is one in which the liquid crystal directors can assume either of two different ordered stable configurations of equal or nearly equal energy. (Degeneracy in the sense of equivalent energy is, however, not a prerequisite to bistability.)

Figure 1:
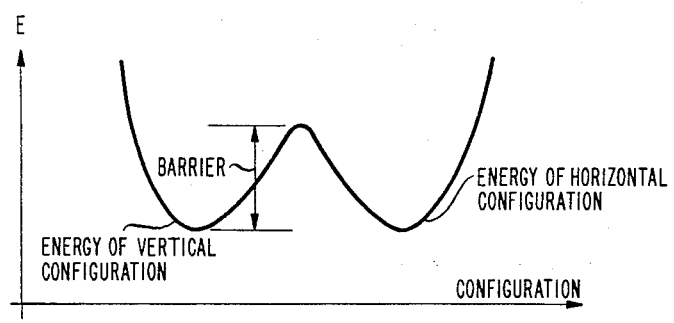
FIG. 1 shows, in graphical form, an energy diagram which illustrates the concept of bistability.

Our analysis of this problem has led us to the conclusion that one class of mechanically stable configurations is that in which movement of disclinations through the bulk of the liquid crystal material or possibly on the surface of the substrates is necessary in order to switch from one stable configuration to another. The movement of the disclinations causes the director alignment of one stable configuration to evolve into the director alignment of another stable configuration in such a manner that the intermediate configurations separating the stable configurations have a higher elastic energy content than either of the two stable configurations. This fact provides the energy barrier which causes the initial and final configurations to be stable with respect to each other. This relationship is illustrated in FIG. 1. Our invention provides these disclinations either by specifying boundary conditions on the substrate surfaces which provides topological singular points thereon, which singular points serve as sources of disclinations, or by specifying means for generating disclinations such as by specific electrode arrangements which provide inhomogeneous electric fields. A singular point is to be defined, for our purposes, as a point on the surface enclosing the liquid crystal cell at which a director alignment ambiguity exists. This ambiguity means that the director alignment at the particular point is not uniquely determinable from the given boundary conditions.

In its most general form we may state that this first aspect of the present invention encompasses all liquid crystal cells having a liquid crystal material mainly in the nematic mesophase whose boundary either contains at least two singular points or means for generating disclinations at at least two points. We note that as just stated the most general statement of the present invention may include stable configurations which are not optically differentiable. In the following material we will restrict our discussion to those preferred configurations which are optically differentiable, namely those configurations having a substantial fraction of the directors in the bulk of the liquid crystal in the liquid crystal cell aligned in either the vertical or horizontal directions.

Before starting the description of specific embodiments of the present invention we would like to point out one further aspect of a general nature. In general the stable configurations within the liquid crystal cell can have two or three dimensional symmetry. Two dimensional symmetry means that the projection of each of the directors upon all planes parallel to a symmetry plane, said symmetry plane taken parallel to the vertical direction has a constant value. The three dimensional symmetry does not satisfy the above condition. Note, however, that we can refer more graphically to the two-dimensional symmetry configurations as the untwisted configurations and the three dimensional symmetry modes as the twisted configurations.

Of course the particular type of configuration, whether twisted or untwisted, will depend on the specific boundary conditions imposed on the surfaces containing the liquid crystal cell. However, for simplicity, we will refer to a "vertical" stable configuration where the majority of directors are in the vertical direction whether this be a twisted or untwisted configuration and similarly for a "horizontal" stable configuration. We will make specific note below of the differences between twisted and untwisted configurations when it becomes necessary.

STRUCTURES

Before we discuss the specific boundary conditions on the two substrate surfaces for devices constructed according to the present invention and the manner in which they provide for stable configurations, we need to specify some nomenclature.

Figure 2:
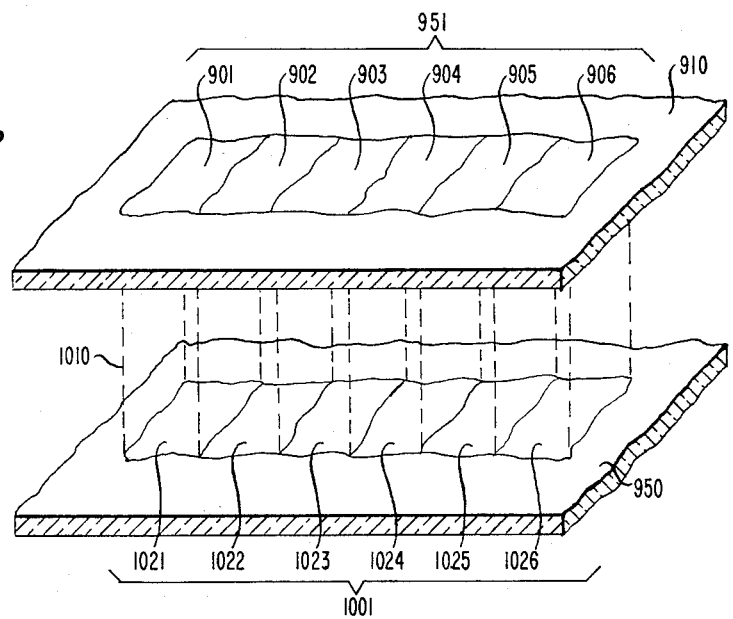
FIG. 2 shows, in diagrammatic form, a liquid crystal cell.
Figure 3:
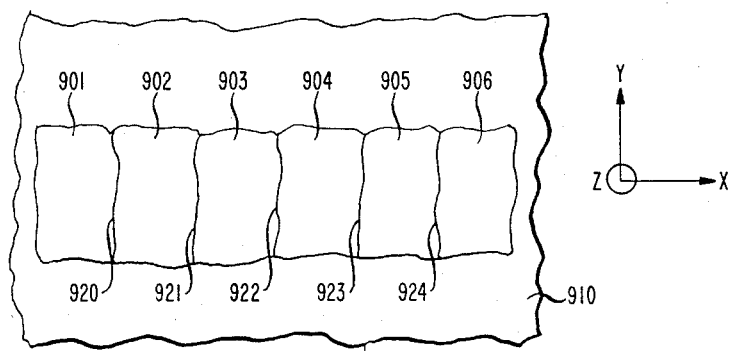
FIG. 3 shows, in diagrammatic form, the surface of a substrate with regions of director alignment giving rise to lines of singular points at the boundaries between said regions.

FIG. 2 shows substrates 910 and 950 having a liquid crystal material disposed therebetween. Volume 1010 shows, in most general form, the liquid crystal cell which is bounded on top by section 951 made up of regions 901-906 on the surface of substrate 910, on the bottom by section 1001 made up of regions 1021-1026 on the surface of substrate 950 and on the sides by the surrounding volume of liquid crystal material. Clearly then in our terminology a device comprises many liquid cells. However, in order to most clearly emphasize the critical aspect of the invention we will describe first the liquid crystal cell as though it is isolated from other cells. Later when a thorough understanding of this cell is obtained we will discuss how these liquid crystal cells are combined to form different devices. FIG. 3 shows a portion of the surface of substrate 910 which is disposed adjacent to the liquid crystal material. Regions 901-906 of the surface are configured so that specific boundary conditions for director alignment in the liquid crystal material are provided.

Figure 4:
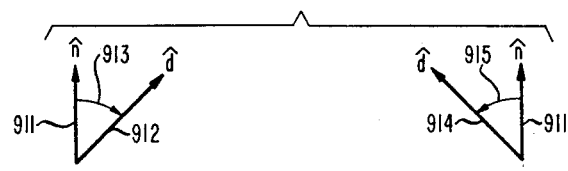
FIG. 4 shows, in diagrammatic form, the definition of positive and negative alignment with respect to a normal to a substrate surface which points into the liquid crystal material.

When substrate 910 is planar we can define a normal to substrate 910 which points into the liquid crystal material. In FIG. 4 arrow 911 denotes a normal, n, to substrate 910 which points into the liquid crystal material. Arrows 912 and 914 denote the direction of orientation, d̂, of a director in the liquid crystal material. We define angle 913 to be positive with respect to normal 911 when n̂×d̂ points into the plane of the paper containing FIG. 4 and angle 915 to be negative with respect to normal 911 when n̂×d̂ points out of the plane of the paper containing FIG. 4.

Specific embodiments of the present invention are provided by conditioning regions 901-906 and 1021-1026. As one example, substrate 910 is conditioned so that the directors at the surface in region 901 are aligned to be parallel to each other at an angle $\theta$, parallel to each other at an angle $-\theta'$ in region 902 and so on. For this particular case singular points are found along the boundaries 921-924 between the regions. In fact, this particular boundary condition produces a line of singular points on boundaries 920-924.

Figure 5:
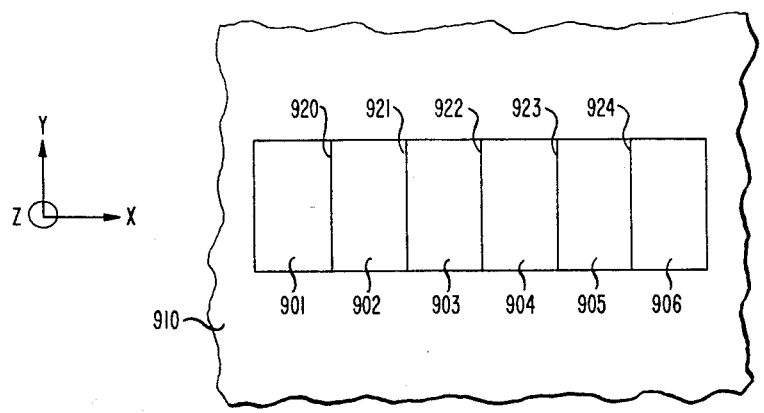
FIG. 5 shows, in diagrammatic form, the surface of a substrate with regions of director alignment having straight line boundaries.

As is shown in FIG. 5 typical regions on the substrate surface are normally manufactured having regular patterns so that boundaries 920-924, which comprise a line of singular points, may for example be straight lines which are parallel to and equidistant from each other.

Finally, as a last bit of nomenclature we discuss the twisted and untwisted configurations. For purposes of this discussion we consider a liquid crystal cell where the top substrate surface has been treated so that directors are aligned to be parallel to each other at an angle $\theta$ at the surface, where $\theta$ is measured from the surface normal, and the bottom substrate surface has been treated so that directors are aligned parallel to each other at an angle $-\theta$ at the surface. The illustrative figures we will make in discussing this point will all have reference to a view of the cell obtained by slicing the cell with a plane perpendicular to the substrates. We will define the plane to contain the Z-X axis of a three dimensional coordinate system. We will view the slice of the liquid crystal cell by looking into the positive Y direction. The arrows in the region of the cell between the substrate surfaces represent the direction of orientation of the directors. When a director is oriented out of the above-defined Z-X plane we have shortened its length.

Figure 6:
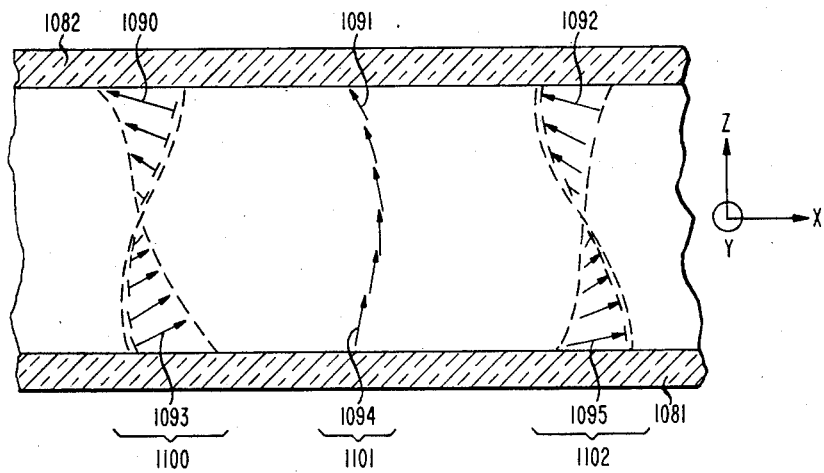
FIG. 6 shows, in diagrammatic form, untwisted and twisted director alignment configurations.

FIG. 6 shows a schematic representation of three director alignment configurations, 1100-1102, that satisfy the above-defined boundary conditions. Note that arrows 1090-1092 and 1093-1095 are aligned parallel to each other respectively. These arrows are shown as full length to denote the fact that they lie in the Z-X plane shown in FIG. 6.

Configuration 1101 is denoted as a two-dimensional configuration or an untwisted configuration. Its noteworthy feature is that all the directors lie in the Z-X plane and do not twist out of it.

Configurations 1100 and 1102 are denoted as three-dimensional configurations or twisted configurations. The noteworthy feature is that the directors are not all aligned in the Z-X plane. Configuration 1100 is referred to as a right twist configuration and configuration 1102 is referred to as a left twist configuration. It should be clear that, for illustrative purposes, we are considering a twist of 180 degrees. We have discovered that the formation of the twisted or untwisted configurations are functions of liquid crystal material parameters such as the moduli of elasticity, magnitude of director alignment angles at substrate surfaces and the relative alignment of the substrate surfaces with respect to each other. However, the structure of the devices and the method in which they operate is most straightforwardly understood if we deal with the two-dimensional or untwisted mode. We will of course note, as we go along, any pertinent differentiations in either fabrication or in operation.

In the discussion to follow we will again have reference to a view of a liquid crystal cell obtained by slicing the cell with a plane perpendicular to the substrates. We will define the plane to contain the Z-X axis of a three dimensional coordinate system. We will view the slice of the liquid crystal cell by looking into the positive Y direction.

FIGS. 7, 12, 13 and 14 show the pattern of liquid crystal directors for four embodiments of liquid crystal cells having at least two stable configurations. In each of the embodiments the stable configurations will be referred to as either a "vertical" configuration, i.e., where a substantial portion of the directors are aligned along a direction which is substantially parallel to arrow 100, i.e., the Z direction, in FIG. 7 or a "horizontal" configuration, i.e., where a substantial portion of the directors are aligned along a direction which is substantially parallel to arrow 101, i.e., the X direction, in FIG. 7. These two configurations are both stable and optically differentiable with respect to one another.

In the structures described below we would like to note that although the substrate planes are shown to be substantially parallel for ease of explanation this is not a critical requirement of the present invention.

ALTERNATING-TILT GEOMETRY

Figure 7:
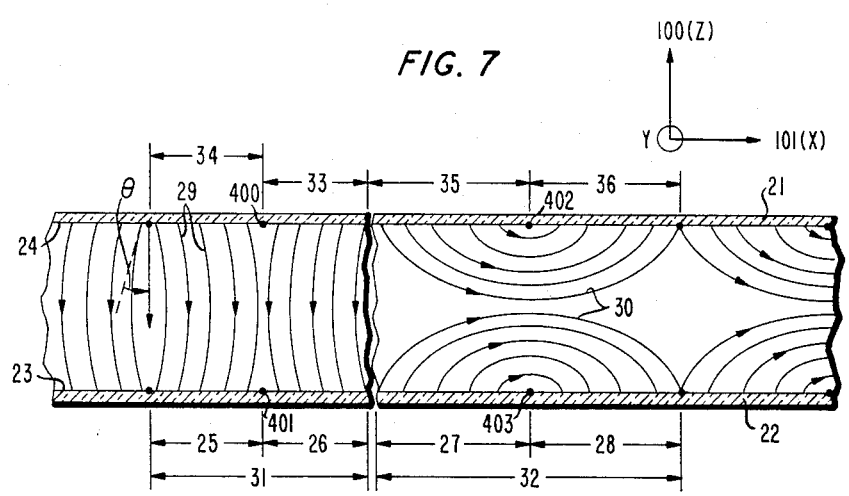
FIG. 7 shows a diagrammatic cross section of an embodiment of the present invention having the substrate surfaces fabricated so that nematic directors are aligned at a tilt angle of $+\theta$ in alternate regions and $-\theta$ in the inbetween regions on the substrate surface, said FIG. 7 showing one section of the embodiment being in a "planar vertical" stable configuration and another section of the embodiment being in a "horizontal" stable configuration.

FIG. 7 shows a cross section of a liquid crystal cell which has been cut in a vertical plane, i.e., a plane defined by arrows 100 and 101 corresponding to the Z and X axes respectively. The liquid crystal cell comprises substrates 21 and 22 and a nematic liquid crystal material between the substrates.

Surfaces 23 and 24 of substrates 21 and 22 have been fabricated such that nematic directors at a substrate surface are preferentially aligned at a tilt angle $|\theta|$ to a normal to the surface which points into the liquid crystal material. Regions 25, 26, 27 and 28 on surface 23 of substrate 22 are areas having alternating patterns of tilt directions of $+\theta$ and $-\theta$. (There is no specific requirement that the tilt angle have the same magnitude in alternate regions θ should, however, be approximately within the range of angles between 22.5 degrees and 67.5 degrees.)

Figure 8:
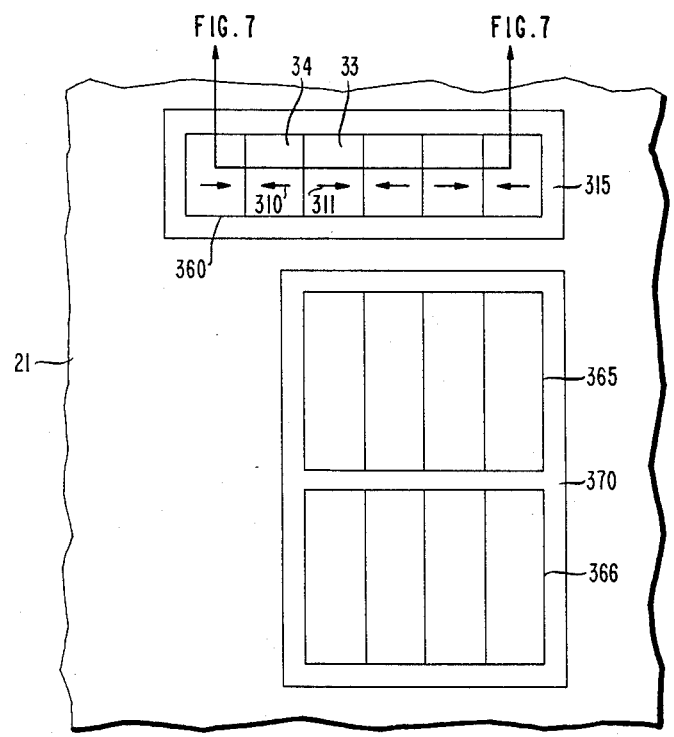
FIG. 8 shows in diagrammatic form a top view of a cell element as appropriate for use in a display for the "alternating-tilt geometry" embodiment shown in FIG. 7.

FIG. 8 shows, in diagrammatic form, the top view of surface 24 of FIG. 7 for the "alternating-tilt geometry" embodiment. FIG. 8 corresponds to a top view of the liquid cell, i.e., a view looking in the negative Z direction. FIG. 7 corresponds to a cross section of the cell along the direction indicated by the arrows in FIG. 8. In FIG. 8, arrows 310 and 311 denote the projection, onto the X-Y plane, of the direction of director alignment, in regions 34 and 33 of substrate surface 24 in FIG. 7. Region 315, shown in FIG. 8 as a strip, is defined by a boundary condition whose surface alignment of the directors isolates one liquid crystal cell boundary, 360, from other liquid crystal cell boundaries, 365 and 366, which comprise a liquid crystal device. As will be discussed hereinbelow an appropriate boundary condition for this isolation comprises a surface treatment which produces a uniformly tilted alignment.

Figure 9:
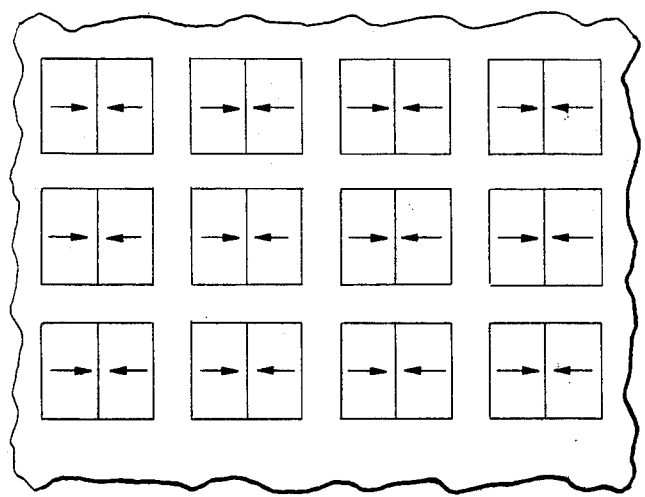
FIG. 9 shows, in diagrammatic form, the top view of several cells shown in FIG. 8 taken together.

It should be clear to those skilled in the art that a liquid crystal cell boundary on a substrate surface, such as is shown by 360 in FIG. 8, need not be restricted to a particular number of regions or a particular shape. For example cell boundaries 365 and 366 in FIG. 8 show a configuration where two cell boundaries, each having four regions, are terminated by region 370. FIG. 9 shows, in diagrammatic form, the top view of the surface of a substrate of a device comprising several cells.

We have found that a preferred mode for the "alternating-tilt geometry" embodiment has angles of tilt which are equal in magnitude. We prefer the magnitude of the tilt angle to be 45 degrees because then the "vertical" and "horizontal" stable configurations are nearly degenerate in energy.

Surface 24 in FIG. 7 is fabricated so that a pattern of director alignments similar to the one on surface 23 is provided. The arrows on director lines 29 show the directions that directors would take in a "vertical" stable configuration. (Notice that the orientation is such that the tails of all arrows in section 31 leave surface 24 and the points of all arrows enter surface 23. The pattern of arrows at substrates 23 and 24 is the same for both the untwisted and twisted vertical configurations, although the latter allows a continuous rotation of the director about the Z axis between substrates 23 and 24.) The arrows on director lines 30 show the directions that directors would take in a "horizontal" stable configuration. (Notice that the orientation is such that the tails of the arrows leave both surfaces 24 and 23 and the points of the corresponding arrows enter both surfaces 24 and 23 respectively.) Thus, in order to switch from the "vertical" stable configuration, shown in section 31, to the "horizontal" stable configuration, shown in section 32, the directors in the vicinity of region 25 on surface 23 and region 33 on surface 24 must be turned around. Furthermore, the directionality change must be propagated so that the lines 29 rearrange to form lines similar to lines 30. It is this movement which is the movement of disclinations.

Figure 10:
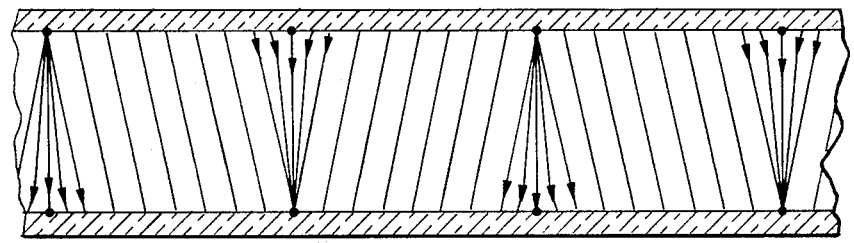
FIG. 10 shows a diagrammatic cross section of an embodiment of the present invention where the substrate surfaces have been translated horizontally from the position shown for the "alternating-tilt geometry" embodiment shown in FIG. 7, the directors being aligned in a "vertical" stable configuration.
Figure 11:
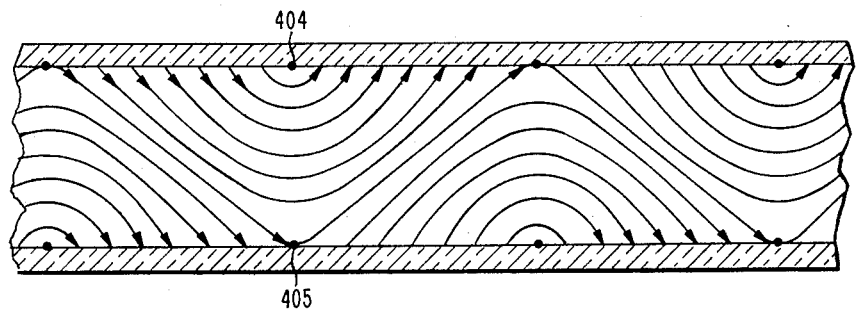
FIG. 11 shows a diagrammatic cross section of an embodiment of the present invention where the substrate surface have been translated horizontally from the position shown for the "alternating-tilt geometry" embodiment shown in FIG. 7, the directors being aligned in a "horizontal" stable configuration.

FIG. 7 displays the "alternating-tilt geometry" embodiment with the substrates lined up over each other in a specific manner. We want to indicate that the alignment shown is not critical. The substrate surfaces may be translated with respect to each other along the direction of arrow 101 and still provide bistable operation. FIG. 10 shows, in diagrammatic form, a cross section of an "alternating-tilt geometry" embodiment in a "vertical" stable configuration where the substrates have been translated relative to each other from the positions shown in FIG. 7. FIG. 11 shows, in diagrammatic form, a cross section of the "alternating-tilt geometry" embodiment of FIG. 10 in a "horizontal" stable configuration.

Points 400–403 in FIG. 7 are singular points, i.e., points at which a director alignment ambiguity exists. Note that in the embodiment shown in FIG. 7 the singular points are aligned over each other in such a manner that the director alignments about the singular points 400 and 402 on the top substrate surface 21 are the mirror image of the director alignments about the singular points 401 and 403 on the bottom substrate surface 22. Points 404 and 405 in FIG. 11 are singular points. However, in contrast with the embodiment shown in FIG. 7, the singular points are aligned over each other so that the director alignments about the singular point 404 are not the mirror image of the director alignment about singular point 405. Thus, in FIG. 7 regions of positive tilt angle 25, 27, 33 and 36 are aligned over regions of negative tilt angle 26, 28, 34 and 35, whereas in FIG. 10 and 11, regions of positive tilt angle are aligned over regions of positive tilt angle.

Note again that the angle of tilt of directors on either side of the singular points need not be exactly the same. We prefer angles which are substantially the same for ease of manufacture and to achieve degeneracy for the configurations.

SINGLE-TILT GEOMETRY

Figure 12:
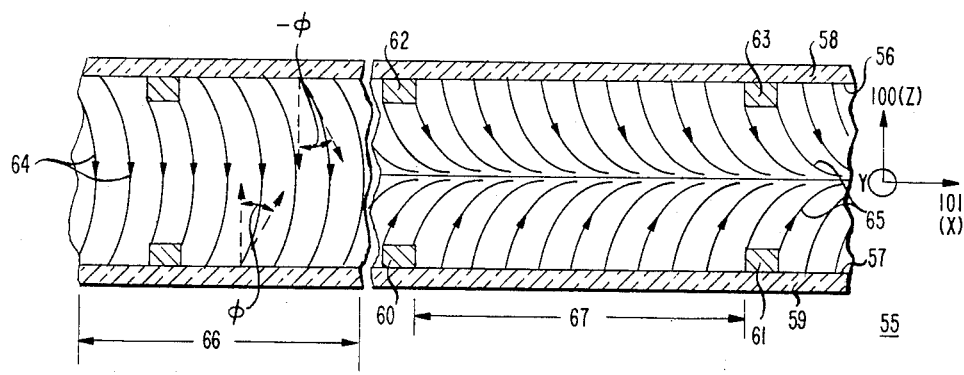
FIG. 12 shows a diagrammatic cross section of an embodiment of the present invention having the substrate surfaces fabricated so that nematic directors are aligned at the same tilt angle $\theta$ on the substrate surface, said FIG. 12 showing one section of the embodiment being in a "planar or nonplanar vertical" stable configuration and another section of the embodiment being in a "horizontal" stable configuration.

In embodiment 55, shown in FIG. 12, surfaces 56 and 57 of substrates 58 and 59 have been fabricated such that the directors at the substrate surface are preferentially uniformly aligned at a tilt angle $\Phi$ with respect to a normal to each surface, which normal points into the liquid crystal material. The tilt angle of directors on surface 57 of substrate 59 is $+\Phi$ while the tilt angle of directors on surface 56 of substrate 58 is $-\Phi$. Although we prefer the same angle $\Phi$ for both substrate surfaces for ease in manufacture, they need not be exactly equal. The substrates also include electrodes 60, 61, 62 and 63, etc. These electrodes provide surface discontinuities at which disclinations are formed. These disclinations are formed at the surface or in the bulk of the liquid crystal material in the vicinity of the surface. The surface discontinuities clearly can be formed by other means such as deformation of the substrate surface having corners. However, the electrodes are convenient because they also serve as a means for providing stress centers for detaching and pinning these disclinations. (Note that in other embodiments there is no need to utilize the electrodes to generate singular points and the electrodes may indeed be buried in the substrate surface. In the other embodiments we have shown the electrodes disposed on the substrate merely for illustrative purposes and note that this is not critical for the operation of these other embodiments.) These disclinations are detached and moved between electrodes when the device is switched from one stable configuration to another.

The arrows on director lines 64 show the directions that directors would take in an untwisted "vertical" stable configuration. (Notice that the orientation is such that the tails of the arrows leave surface 56 and the points of the arrows enter surface 57.) The arrows on director lines 65 show the directions that directors would take in a untwisted "horizontal" stable configuration. (Notice that the orientation is such that the tails of the arrows leave both surfaces 56 and 57 respectively. Thus, in order to switch from the "vertical" stable configuration, shown in section 66, to a "horizontal" stable configuration, shown in section 67, the directors in the vicinity of section 66 on surface 57 must be turned around. Furthermore, the directionality change must be propagated so that the directors along lines 64 rearrange so that lines similar to lines 65 are formed. It is this movement which is the movement of a disclination through the body of the liquid crystal material. The transition from the "vertical" to the "horizontal" stable configuration cannot occur continuously without the detachment, propagation and reattachment of disclinations. These disclinations are produced by local stresses induced by topological singular points at the surfaces, i.e. notches or the sharp corners of the electrodes, and moved by the inhomogeneous electric field stresses set up by interdigital electrode patterns.

The particular structure shown in FIG. 12 has been arranged so that the plane of the directors is the Z-X plane for both the top and bottom substrates. Another way of stating this is to consider, on each substrate, the line formed by the intersection of the substrate plane, for planar substrates, and the plane parallel to the director alignments at the substrate surface. We will call these lines "substrate alignment lines". The structure shown in FIG. 12 corresponds to a relative orientation of the two substrates having both of the above-described substrate alignment lines parallel.

We have noted that twisted configurations, shown in FIG. 6 are also formed in this embodiment. The twisted "vertical" stable configuration has a substantial portion of the director alignments in the bulk of the liquid crystal material in the vertical direction and for this reason is similar to the untwisted configuration. However, as can be seen from FIG. 6 the directors must undergo a 180 degree twist in going from the top substrate surface to the bottom substrate surface. It is important to note, however, that transition between the "vertical" and "horizontal" twist configurations requires the movement of disclinations and it is this requirement, provided by the boundary conditions, which produces the bistability.

We can see, however, that the twisted configurations and the untwisted configurations are not separated by a disclination. In fact, we note that the right twist configuration, 1100 in FIG. 6, and the left twist configuration, 1102 in FIG. 6, are separated by an untwisted configuration 1101.

We have concluded that it is possible to fabricate a liquid crystal cell having a twisted or untwisted "vertical" stable configuration by properly adjusting the tilt angle of director alignment at the substrate surfaces and the ratio of elastic moduli of the liquid crystal material. For example, for small tilt angles from the normal to a substrate surface we expect to find untwisted configurations whereas for large tilt angles from the normal we expect to find twisted configurations. This can be understood heuristically because if the angle of tilt is large it is easier, i.e., requires less energy, for the director to rotate around 180 degrees to change its direction so as to point into the other substrate, see directors 1093 and 1090 in FIG. 6, than it would be for it to bend over a large angle in the vertical direction, see directors 1094 and 1091 in FIG. 6. Conversely, if the angle of tilt is small, it is easier, i.e. requires less energy, to bend in the vertical direction than to rotate around 180 degrees. Clearly, this illustrates that the elastic moduli of the liquid crystal material are pertinent because they will determine whether it requires less energy to rotate or bend.

From the above discussion it is clear that for a given liquid crystal material there is an angle which divides those cells which will have an untwisted from those which will have twisted configurations. The precise value of this angle cannot be specified because it depends on the actual conditions of the cell, such as thermal conditions which may affect the elastic moduli and the orientation of the substrates themselves.

In the discussion so far we have been referring to FIG. 12 where the substrate alignment lines have been parallel. Clearly if the alignment lines are substantially nonparallel the configurations will, of necessity, be twisted configurations. Of course if the alignment lines are slightly nonparallel, in manufacture, it will probably be impossible to achieve perfect parallelism, then this will tend to give a bias toward forming a twist state. This will mean that the angle which separates untwisted from twisted configurations will have a larger value, i.e. if we want to ensure untwisted configurations we would make the tilt alignments at the surface smaller to provide a margin of safety.

SAW-TOOTH GEOMETRY

Figure 13:
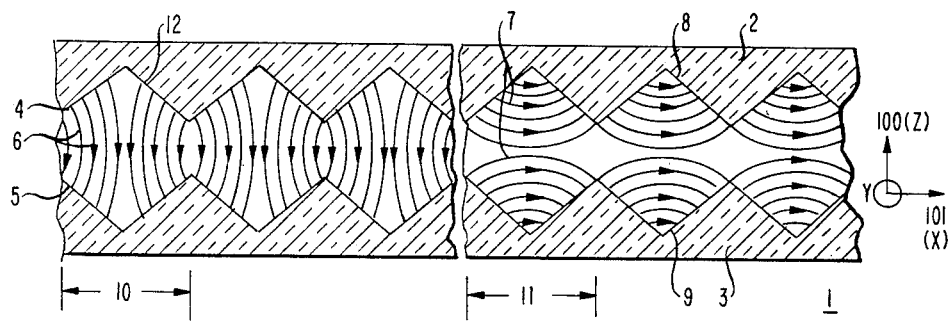
FIG. 13 shows a diagrammatic cross section of an embodiment of the present invention having a triangular cross section of the substrate surfaces and having the substrate surfaces fabricated so that nematic directors are aligned substantially perpendicular to the substrate surfaces, said FIG. 13 showing one section of the embodiment being in a "planar or nonplanar vertical" stable configuration and another section of the embodiment being in a "horizontal" stable configuration.

In embodiment 1 shown in FIG. 13 the surface of substrates 2 and 3 have been fabricated such that surfaces 4 and 5 form a saw tooth pattern. The surfaces 4 and 5 have been treated with surfactants so that nematic directors are preferentially aligned substantially perpendicular to the surface. The arrows on director lines 6 show the directions that directors would take in an untwisted "vertical" stable configuration. (Notice that the orientation in section 10 is such that the tails of the arrows leave surface 4 and the points of the arrows enter surface 5.) The arrows on director lines 7 show the directions that directors would take in an untwisted "horizontal" stable configuration. (Notice that the orientation in section 11 is such that the tails of the arrows leave both surfaces 4 and 5 and the points of the arrows enter both surfaces 4 and 5 respectively.) Thus, in order to switch from the "vertical" stable configuration, shown in section 10, to the "horizontal" stable configuration, shown in section 11, the directors in the vicinity of region 12 on surface 4 and of region 13 on surface 5 must be redirected. Furthermore, the directionality change must be propagated so that lines similar to lines 7 are formed. It is this movement which is the movement of a disclination. This movement may be achieved by the detachment and movement of disclinations along the bounding surfaces with the bulk alignment remaining nonsingular, or it may be achieved by the detachment and movement of an additional bulk disclination. This movement and reconfiguration of the directors requires the addition of energy and creates the energy barrier which provides stability between the two configurations.

ALTERNATING PARALLEL-PERPENDICULAR GEOMETRY

Figure 14:
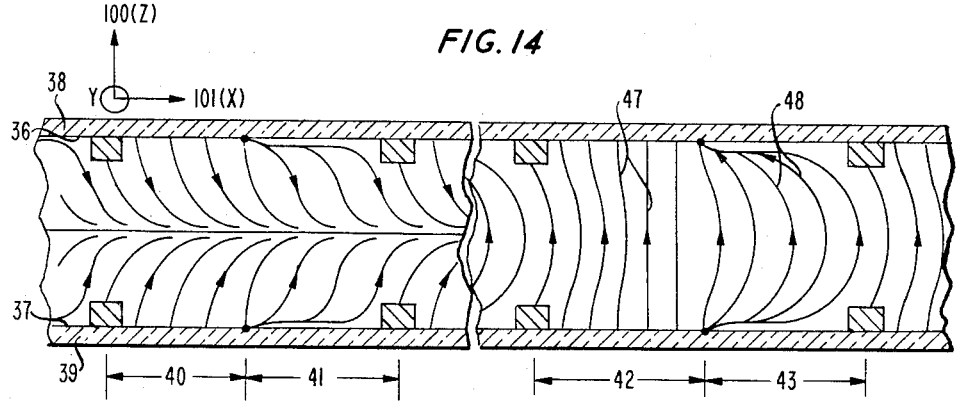
FIG. 14 shows a diagrammatic cross section of an embodiment of the present invention having the substrate surfaces fabricated so that nematic directors are aligned either parallel or perpendicular to the substrate surface in alternating regions of the substrate surface, said FIG. 14 showing one section of the embodiment being in a "vertical" stable configuration and another section of the embodiment being in a "horizontal" stable configuration.

In embodiment 35 shown in FIG. 14 the surfaces 36 and 37 of substrates 38 and 39 have been fabricated such that the nematic directors are preferentially aligned alternatively parallel or perpendicular to the substrate surfaces. Regions 40–43 on surface 37 of substrate 39 are areas having alternating directions of parallel and perpendicular alignment. A similar pattern is impressed on surface 36 of substrate 38. The arrows on director lines 47 show the directions that directors would take in an untwisted "vertical" stable configuration in a region, like region 42, where the directors are preferentially aligned perpendicular to the surfaces. The arrows on director lines 48 show the directions that orientational directors would take in a twisted "vertical" stable configuration in a region, like region 43, where the directors are preferentially aligned parallel to the surface. The director alignments shown in FIG. 14 are merely a model of the true physical picture because one can envision equivalent director alignments for the stable configurations provided by these boundary conditions.

PHYSICAL MECHANISM PRODUCING STABILITY

The following discussion outlines a model of our understanding of the manner in which the above-disclosed embodiments produce multistable configurations. We are disclosing this model with the customary statement that the true physical manifestation may involve a combination of intermediate configurations: some involving disclination movement on the surface of the substrates and some involving complex disclination formation and movement in the bulk of the liquid crystal material.

In the following discussion we are referring only to untwisted configurations because they are more amenable to understanding in the form of two dimensional figures. However, note that the discussion of the underlying physical manifestations are the same for both twisted and untwisted configurations.

Figure 15:
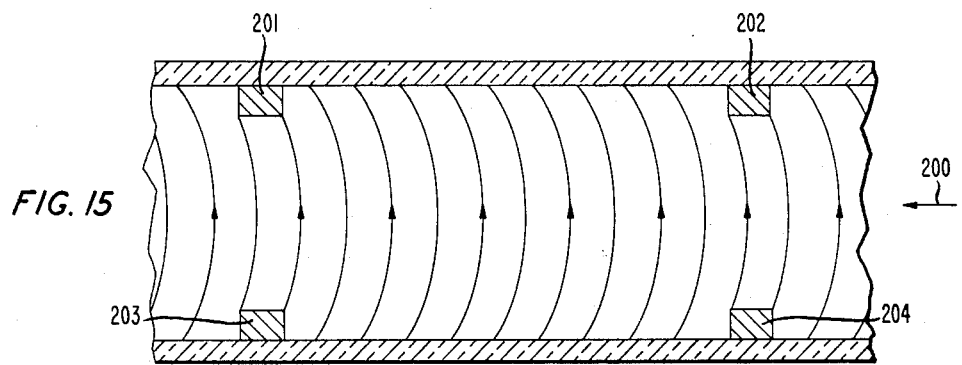
FIGS. 15–18 show, in diagrammatic form, a model of the transition from a "vertical" stable configuration to a "horizontal" stable configuration for the "single-tilt geometry" embodiment shown in FIG. 12 by means of transverse electric fields in the horizontal direction.
Figure 16:
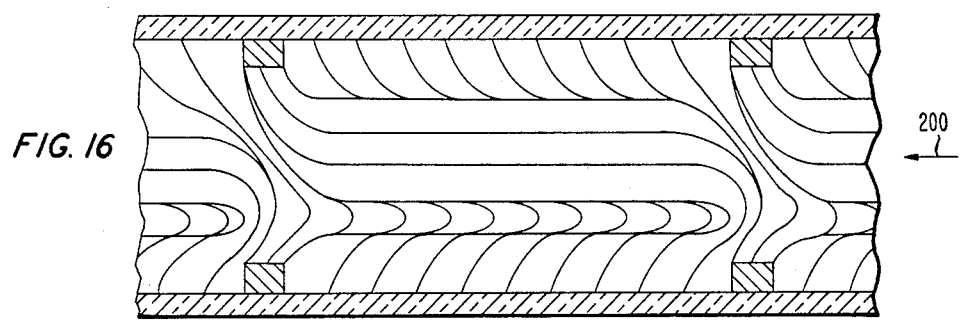
Figure 17:
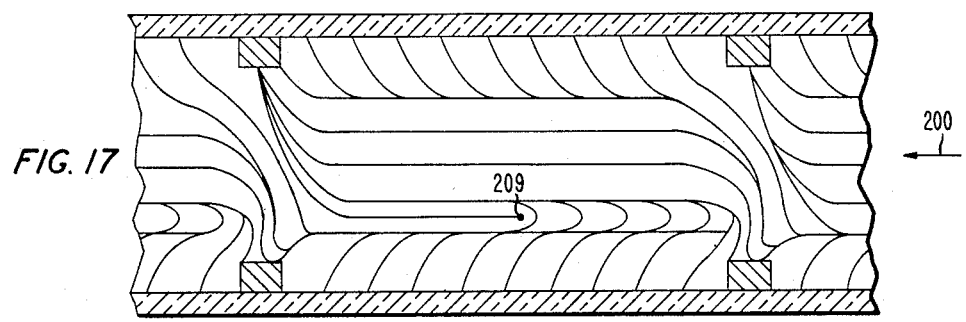
Figure 18:
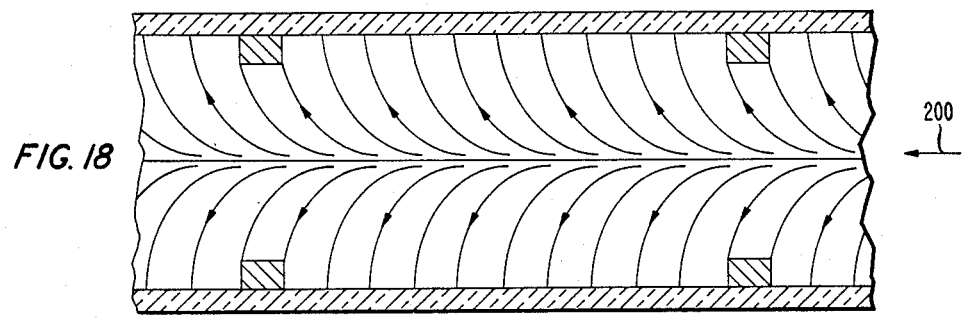
Figure 19:
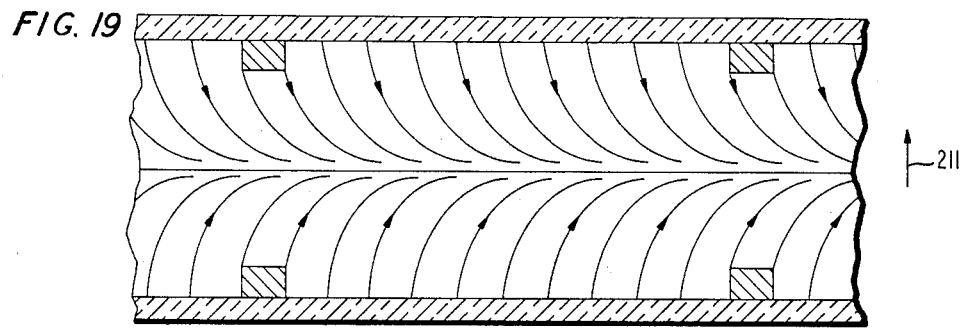
FIGS. 19–22 show, in diagrammatic form, a model of the transition from a "horizontal" stable configuration to a "vertical" stable configuration for the "single-tilt geometry" embodiment shown in FIG. 12.
Figure 20:
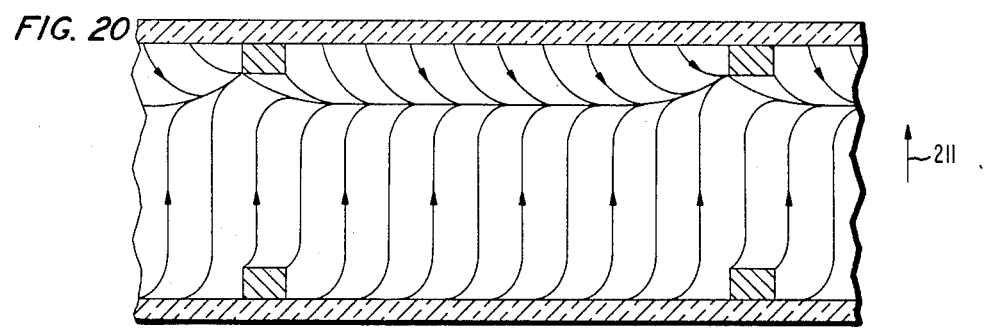
Figure 21:
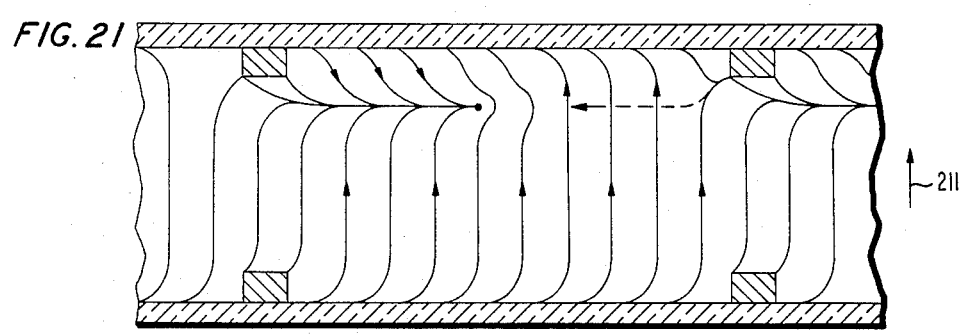
Figure 22:
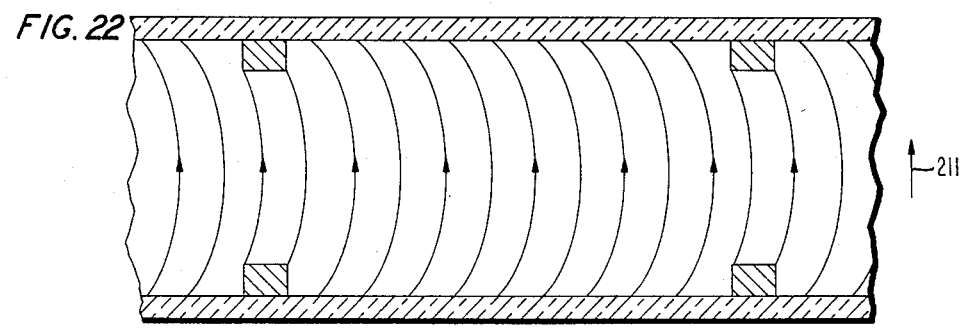

FIGS. 15–18 show the transition of director alignments for switching from a "vertical" stable configuration to a "horizontal" stable configuration under the influence of a transverse electric field whose direction is shown by arrow 200. The transverse electric field is generated by applying appropriate voltages to electrodes 201–204 as will be further described hereinbelow. The sharp corners of the electrode structure shown in cross section in FIG. 15 provide regions of maximum stress in the liquid crystal material at which disclinations are generated. The interdigital electrodes do not generate uniform transverse fields and the resultant irregular field lines set up nonuniform stresses in the bulk of the liquid crystal material. These field-induced elastic stresses are eased by the detachment and subsequent movement of strength one-half disclinations such as 209 in FIG. 17. FIGS. 16 and 17 also show the propagation of the disclination between the electrodes to relieve the field-induced stresses. The disclinations are "reattached" when the disclination from one electrode has propagated to the neighboring electrode. Here FIG. 18 shows the cell in the "horizontal" stable configuration.

Note that the size of the electrodes which extend into the bulk of the liquid crystal material is usually quite small and is exaggerated in the figures and shown to have a relatively large size for clarity of the description.

Although we have discussed the "single-tilt geometry" embodiment in terms of generation of disclinations by means such as notches or the corners of the electrodes it is important to note that the disclinations may be generated by the intense inhomogeneous fields produced by specific electrode structures. These would most certainly include those electrodes having sharp corners. In these cases the electrodes need not be used in conjunction with other means for generating singularities such as notches. We believe, however, that the use of electrodes with notches or the like or the use of electrodes which themselves provide singularities due to sharp corners, etc., is preferred over the use of electrodes alone. We feel that the highly inhomogeneous fields necessary to generate disclinations are much harder to produce and lead to the conclusion that this is not a preferred embodiment.

FIGS. 19–22 show the transition of director alignments for switching of the "single-tilt geometry" embodiment from a "horizontal" stable configuration to a "vertical" stable configuration under the influence of a vertical electric field whose direction is shown by arrow 211.

FIGS. 23–27 show the transition of director alignments for switching of the "alternating-tilt geometry" embodiment from a "horizontal" stable configuration to a "vertical" stable configuration under the influence of a vertical electric field applied from interdigital electrodes. Note that in this geometry the alternating tilt pattern provides singular points on the substrate. It is from these singular points that disclinations are moved to relieve the stresses created by the electric fields.

Figure 23:
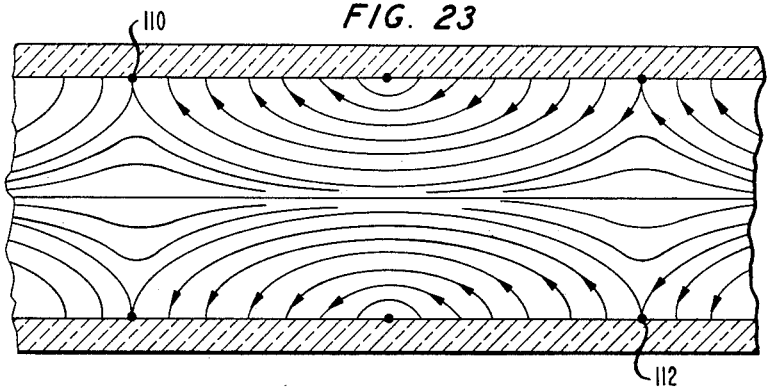
FIGS. 23–27 show, in diagrammatic form, a model of the transition from a "vertical" stable configuration to a "horizontal" stable configuration for the "alternating-tilt geometry" embodiment shown in FIG. 7.
Figure 24:
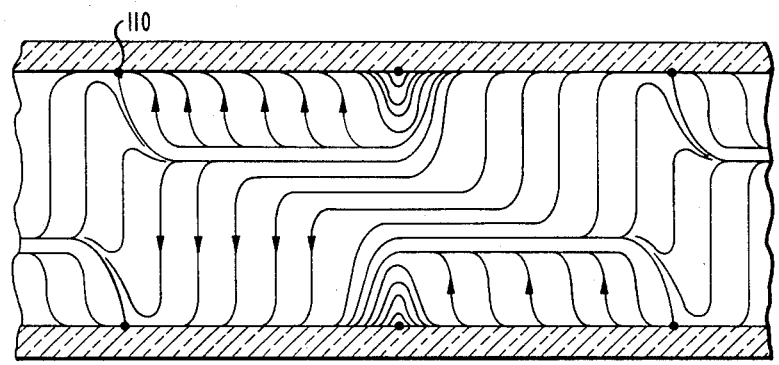
Figure 25:
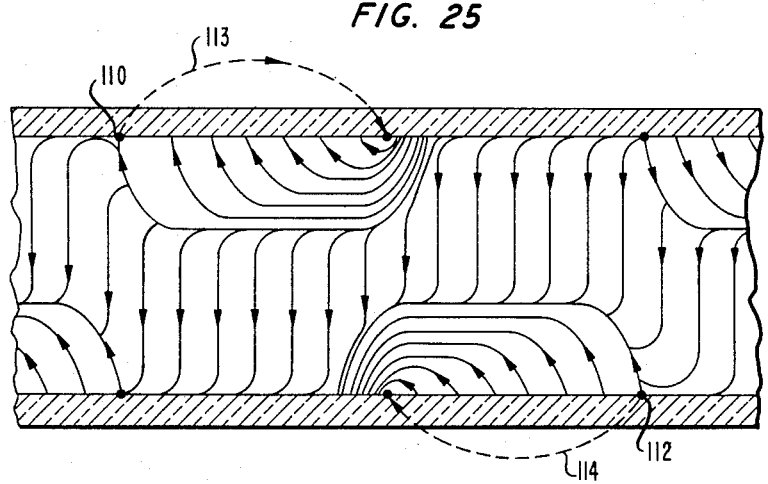
Figure 26:
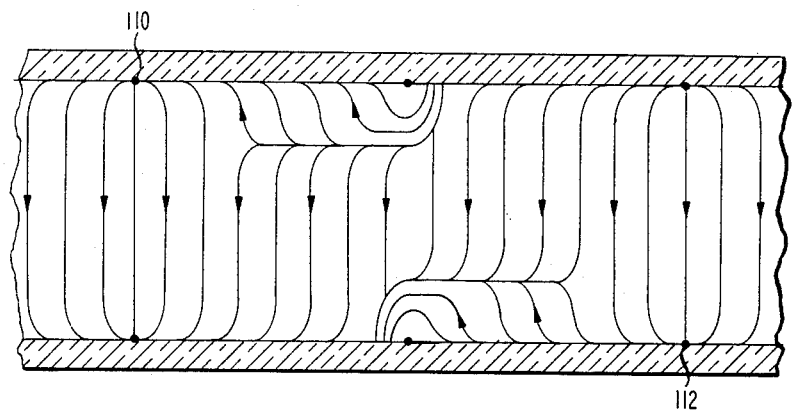
Figure 27:
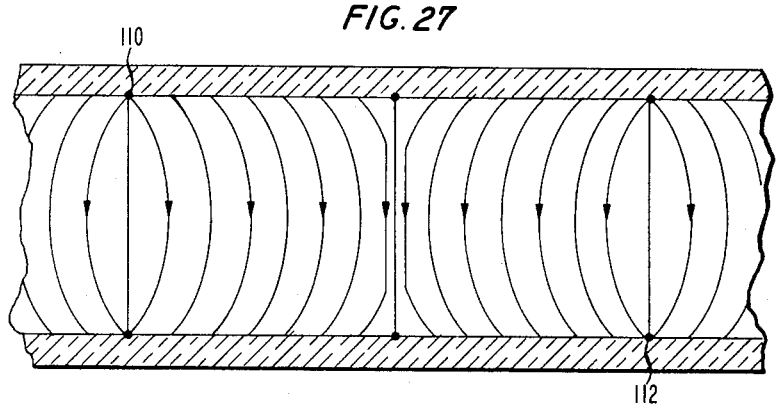

The transition from the "horizontal" stable configuration shown in FIG. 23 proceeds by detachment and movement of disclinations as indicated by arrows 113 and 114 in FIG. 25. Although FIG. 25 shows the movement of the disclinations to be on the substrate surfaces this description is illustrative of one out of many possibilities for the transition to occur. The transition between the stable states could occur by the movement of disclinations through the bulk of the liquid crystal material or by a combination of disclination movement through the bulk and on the surface. It should be clear to those skilled in the art that this is an idealized model of the switching mechanism and that the disclinations which are described as being attached at the substrate surfaces may, in practical devices, actually exist in the liquid crystal material in close proximity to the singular points. However, it is the existence of the singular points which provides for the existence of the disclinations and hence for the stability of the "vertical" and "horizontal" stable configurations with respect to each other.

MECHANISMS TO INITIATE SWITCHING

The switching of the liquid crystal cell between the twisted or untwisted "horizontal" and "vertical" stable configurations may be accomplished by the application of electric or magnetic fields to the liquid crystal material.

Switching between stable configurations requires the ability to apply electric fields to the liquid crystal material having directions which are perpendicular or horizontal to the substrate surfaces. Electric fields which are perpendicular to the substrate surfaces are achieved by imposing voltage differences across interdigital electrodes disposed on opposite substrates (it is preferred to apply the same voltage to the electrodes on the same substrate). Electric fields which are substantially horizontal to the substrate surfaces are achieved by imposing voltage differences across interdigital electrodes disposed on the same substrate. Specific electrode configurations will be discussed further hereinbelow.

Although switching between stable configurations in these devices may be accomplished by the application of magnetic fields, an electric field of 10 volts/cm has the same effect on the liquid crystal material as a magnetic field of 1000 gauss. The fact that electric fields of $10^4$ volts/cm or higher are easily achieved and could have the same effect as a $10^6$ gauss magnetic field for some materials leads us to the conclusion that switching between stable configurations by means of application of magnetic fields is not a preferred mode of operation.

Figure 28:
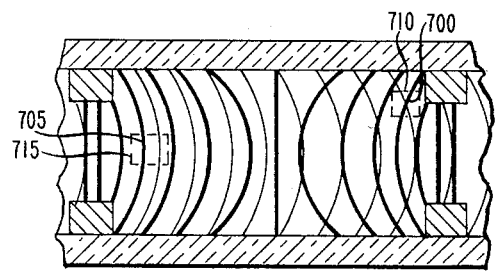
FIG. 28 shows, in diagrammatic form, a cross section of the present invention in a "single-tilt geometry" wherein the field lines for switching from the "horizontal" to the "vertical" stable configuration are displayed.

Note that the use of interdigital electrodes in conjunction with the "single-tilt geometry" embodiment has one small drawback to be considered over the use of interdigital electrodes with the "alternating-tilt geometry" embodiment. Ideal switching requires that the local direction of the electric field applied to produce switching be so disposed as to be parallel to the final director configuration lines. If the field lines are roughly parallel to the initial director alignment then there is little torque operating to promote switching. FIG. 28 shows electric field lines generated to switch the "single-tilt geometry" embodiment from the "horizontal" stable configuration to the "vertical" stable configuration, and the director lines of the "vertical" stable configuration. Note that in the area enclosed by the dotted line 710, the field lines 700 are roughly perpendicular to the director alignments, whereas the field lines 705 are nearly parallel to the director alignments in the area enclosed by dotted line 715. Thus, the electric field lines produced by this arrangement of interdigital electrodes are nearly orthogonal to the director alignments within a substantial portion of the active area of the cell. This affects the switching from the "horizontal" to the "vertical" stable configuration, especially with large boundary tilt angles. This problem is improved as the tilt angle decreases towards normal, and does not occur in the "alternating-tilt geometry" embodiment.

Switching may be also accomplished with an electric field if we use a liquid crystal material having a "two-frequency" dielectric relaxation behavior, i.e., $\Delta\epsilon > 0$ for $f < f_c$, and $\Delta\epsilon < 0$ for $f > f_c$ where f is the frequency of the applied electric field. Thus, when $\Delta\epsilon > 0$, the directors in the liquid crystal material will line up parallel to the applied electric field and when $\Delta\epsilon < 0$, the directors will line up perpendicular to the applied electric field. Thus, the "vertical" stable configuration can be addressed by an electric field directed perpendicular to the substrates and have $f < f_c$ and the "horizontal" stable configuration can be addressed by a transverse electric field having a component along a normal to the symmetry plane of the stable configuration and having $f > f_c$.

OPTICAL DIFFERENTIABILITY BETWEEN CONFIGURATIONS

For untwisted stable configurations optical differentiation is best achieved by the inclusion of pleochroic dyes in the liquid crystal material. A pleochroic dye has the property that absorption is much stronger when the electric field of incident radiation is parallel to the long axis of the dye molecule than when it is perpendicular to it. This property can be used to enhance the transmission of light propagating through the liquid crystal material when the device is in the "vertical" stable configuration as compared to the "horizontal" stable configuration. The directors in the liquid crystal material have the effect of aligning the pleochroic dye molecules parallel to the director configuration lines.

Consider a transmission display using a single polarizer having a direction of polarization parallel to the horizontal direction shown by arrow 101 in FIG. 7. The display would be "off", i.e., absorbing to radiation, if the directors are found to be in a "horizontal" stable configuration such as that shown in section 32 in FIG. 7. The display would be "on", i.e., transmitting to radiation, if the directors are found to be in a "vertical" stable configuration such as that shown in section 31 in FIG. 7.

For twisted configurations the same effect described above with regard to the incorporation of pleochroic dyes into the liquid crystal material is observed. The only difference observable is a qualitative one in that the "on" state for the twisted configuration appears to be slightly darker than the "on" state for the untwisted configuration. This is explainable by noting, as was explained hereinabove, that the twisted configuration usually occurs with larger tilt angles of director alignment at the substrate surfaces than the untwisted configurations, so that on the average the directors are more horizontal in the twisted configuration.

It should also be clear that a reflection display utilizing a single polarizer can also be achieved with pleochroic dyes.

Note that as a general feature of these embodiments the curvature of the director lines reduces the absolute absorption because not all the pleochroic molecules are aligned totally along one axis or the other in either of the stable configurations.

Figure 29:
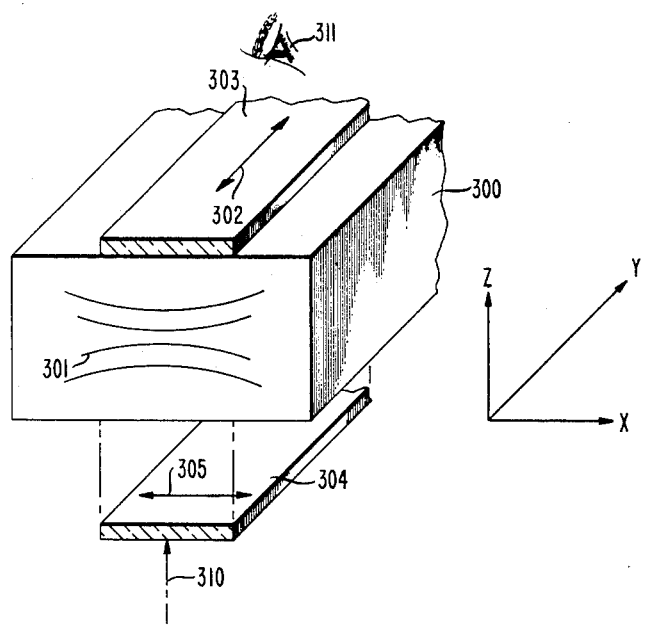
FIG. 29 shows in diagrammatic form a section of the "alternating-tilt geometry" embodiment in the "horizontal" stable configuration with an appropriate disposition of crossed polarizers to provide optical differentiation in a transmission display.

Optical differentiation between stable configurations in liquid crystal cells fabricated according to the present invention may also be accomplished by utilizing crossed polarizers to detect differences in transmission between the twisted "vertical" and "horizontal" stable configurations. FIG. 29 shows one portion, 300, of a liquid crystal cell. A cross section of portion 300 in the Z-X plane shows a director alignment for the "horizontal" stable configuration of an "alternating-tilt geometry" embodiment. A first polarizer, 303, is placed on top of portion 300 and a second polarizer, 304, is placed beneath portion 300. The direction of polarization of first polarizer 303, shown by arrow 302, lies in a plane parallel to the Y-X plane and is parallel to either the X or Y axes. The direction of polarization of second polarizer 304, shown by arrow 305, is perpendicular to the direction of polarization of first polarizer 303. Light transmitted from below portion 300 is detected by detector 311, positioned above portion 300. In theory, light transmitted along the direction shown by arrow 310 should be totally extinguished during transmission through portion 300 for an ideal "horizontal" or ideal planar "vertical" stable configuration, but may be transmitted through portion 300 for an ideal twisted "vertical" stable configuration under some circumstances.

The twisted "vertical" stable configuration leads to extinction when the Mauguin (waveguide) limit is satisfied. This is satisfied in our structure for twisted "vertical" stable configurations having large tilt angles of director alignment with respect to a normal to the substrate surface. The configuration becomes transmitting when the Manguin limit is violated. This violation occurs with low tilt angles. Thus, a homeotropic surfactant coated onto $T_iO_2$ will yield low tilt angles and provide a partially transmitting twisted "vertical" stable configuration.

The advantageous use of pleochroic dyes or crossed polarizers is determined by the molecular orientations and relative stability of untwisted or twisted "vertical" stable configurations, which in turn is determined by the tilt angle at the substrate surfaces for a given liquid crystal material.

It should be clear to those skilled in the art as to how reflective displays utilizing cross-polarizers may be constructed.

CELL FABRICATION

In the following we describe methods of fabricating cells according to an embodiment of the present invention.

Figure 30:
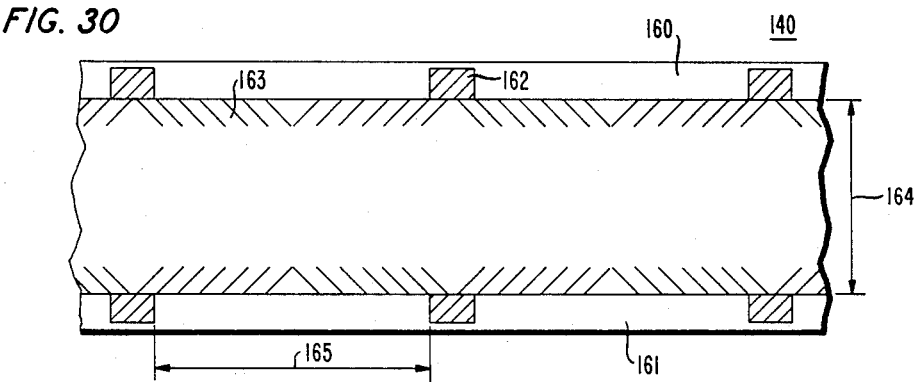
FIG. 30 shows a diagrammatic cross section of an electrode arrangement for switching between stable configurations for the "alternating-tilt geometry" embodiment shown in FIG. 7.

In FIG. 30 we show cell 140 which corresponds to the "alternating-tilt geometry" embodiment shown in FIG. 7. The alternating stripes of tilted boundary alignment at $\pm\theta$ are optimally set at $\pm\theta=45$ degrees. Glass substrates 160 and 161 have interdigital electrodes such as 162 photolithographically produced from $In_2O_3$ or Cr. Lines 163 illustrate the alignment of directors at the surface of substrates 160 and 161. The alternating tilt regions are produced by alternately evaporating $TiO_2$ at an angle of $\pm 5$ degrees from the substrate surface by electron-beam deposition. Other obliquely evaporated oxides may also be used. The domains were photolithographically masked and the substrates are aligned as shown in FIG. 30. Typical dimensions for the cell are: (1) the distance, 164, between substrates is $\approx 10-100\mu$ and (2) the distance, 165, between electrodes is $\approx 10-100$ $\mu$m. We believe optimal performance is achieved when these two distances are substantially the same. However, when fabricating structures, where these two distances are not substantially the same, we believe that better performance will be achieved with structures where both the distance between electrodes and between substrates are small.

Figure 31:
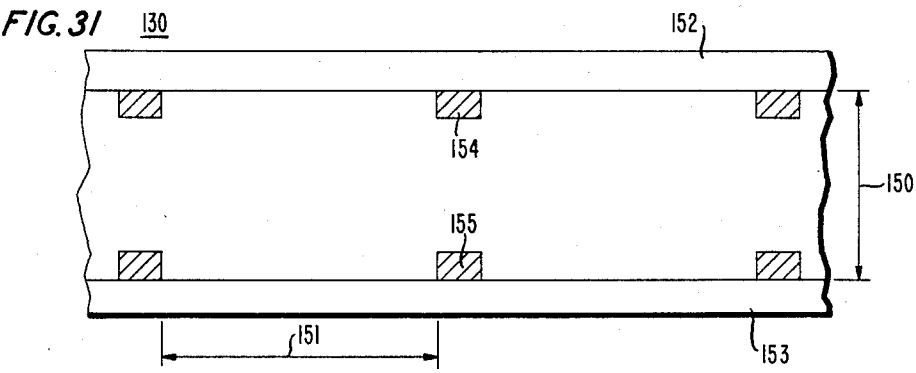
FIG. 31 shows a diagrammatic cross section of an electrode arrangement which provides a means for generating singularities as well as a means for switching between stable configurations for the "single-tilt geometry" embodiment shown in FIG. 12.

The cell 130 shown in FIG. 31 corresponds to the "single-tilt geometry" embodiment shown in FIG. 12. Glass substrates 152 and 153 have $In_2O_3$ conducting electrodes. These interdigital electrodes are photolithographically produced. The single-tilt boundary condition is produced by an oblique electron-beam deposition of $TiO_2$ or $S_iO_x$ at an angle of 5 degrees from the substrate surface. These electrodes provide means for both twisted or untwisted configurations generating disclinations and then detaching and moving them under the influence of electric fields when the cell is switched from a "vertical" to a "horizontal" stable configuration. Typical dimensions for the cells are: (1) the distance, 150, between substrates is $\approx 10-100$ $\mu$m and (2) the distance, 151, between the electrodes is $\approx 10-100$ $\mu$m.

The electrodes in FIGS. 30 and 31 are typically 1–10 $\mu$m wide.

We further note that the parameters for distances 150 versus 151 in FIG. 31 and 164 versus 165 in FIG. 30 were chosen with the following criteria in mind. If distance 151 is much greater than distance 150 then you get a more homogeneous electric field over the bulk of the liquid crystal material. However, you would need a large field and the transition from one configuration to another would take a relatively long time due to disclination transit time. The values used, as disclosed hereinabove, were compromises so that the electric field uniformity was adequate and the transition time reasonable.

We have used varied liquid crystal mixtures between the substrates. Some examples are: (1) "E9" obtained from EM Laboratories, Inc., 500 Executive Blvd., Elmsford, N.Y., an associate of E. Merck, Darmstadt, Germany which is a cyanobiphenyl mixture. (This was doped with 1 percent pleochroic anthraquinone dye "D5", also obtained from EM Laboratories.); (2) cyanobiphenyl mixtures "E7" and "E8" obtained from EM Laboratoreis; and (3) cyanophenylcyclohexane mixture "ZLI-1083", from EM Laboratories. All the above-mentioned mixtures have a large positive dielectric anisotropy, i.e., $\Delta\epsilon\sim +10$, $\epsilon_{||}:\sim 20$, and $\epsilon_{\perp}\sim 5-10$. The liquid crystal material was introduced into the cell by capillary action while the material was in the isotropic phase. The cell was held in a magnetic field directed parallel to the $TiO_2$ deposition directions. The material is allowed to cool to the nematic state and then the cell is sealed.

The following mixtures have a two-frequency dielectric anisotropy: (1) Eastman Kodak Organic Chemicals in a diester mixture; one part "EK 11650", one part "EK 15320", two parts "EK 14046" and a 1 percent pleochroic dye; producing a two-frequency mixture with $\Delta\epsilon>0$ for $f<2.5$ kHz ($\Delta\epsilon\sim 6$ at 50 Hz) and $\Delta\epsilon<0$ for $f>2.5$ kHz ($\Delta\epsilon\sim -2.2$ at 10 kHz); and (2) EM Laboratories compound "ZLI-1085" a two-frequency diester mixture with $\Delta\epsilon=+0.8$ at 100 Hz and $\Delta\epsilon=-0.9$ at 20 kHz. These diesters will switch in a magnetic field or in an interdigital scheme when operated in the same manner as a single frequency material. However, switching is slower for these diesters in the electric field than for the cyanobiphenyl mixtures because $\Delta\epsilon$ is much smaller. For this reason we feel at this time that a preferred embodiment of the device will be a single-frequency nematic driven by vertical and transverse electric fields.

In order to utilize the above-described two-frequency diesters in a two-frequency effect for untwisted configurations we need to configure electrodes which will apply a vertical field at low frequency and a mixture of vertical and transverse fields having field components perpendicular to the symmetry plane of the untwisted configuration at high frequency.

Figure 32:
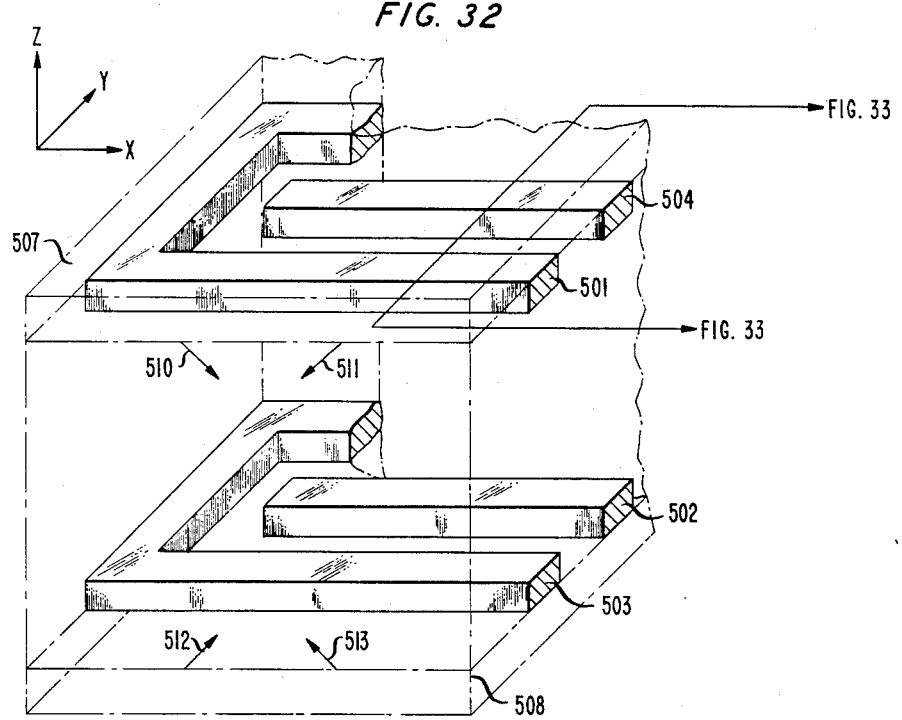
FIG. 32 shows, in diagrammatic form, an embodiment of an interdigital electrode configuration appropriate for use with a two-frequency liquid crystal material in conjunction with the "alternating-tilt geometry"

A specific example of an electrode structure for utilizing the two-frequency effect of two-frequency liquid crystal materials, in conjunction with an "alternating-tilt geometry" embodiment is shown in diagrammatic form in FIG. 32. Arrows 510 and 511 show the tilt boundary conditions on substrate 507, arrows 512 and 513 show the tilt boundary conditions on substrate 508, and numerals 501–504 denote the electrodes.

Figure 33:
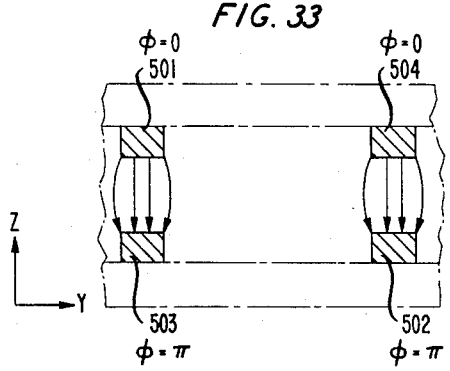
FIGS. 33–35 show, in diagrammatic form, a cross section of FIG. 32 which shows only the electrodes and the phase of the fields applied to the electrodes.
Figure 34:
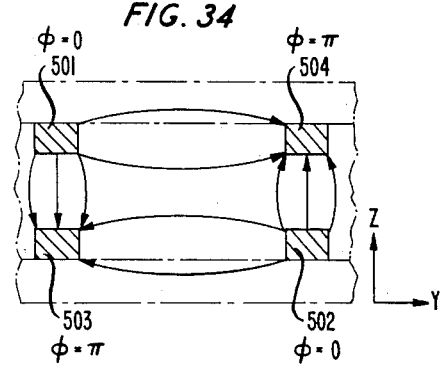
Figure 35:
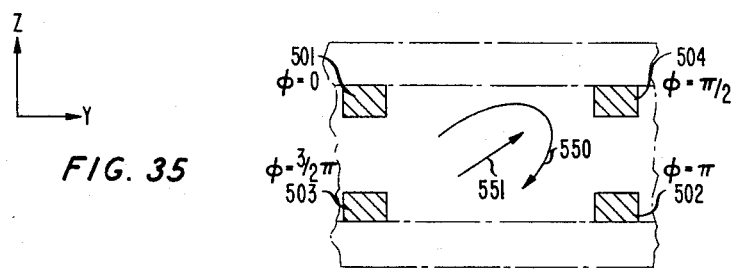

FIGS. 33–35 show a cross section of the electrode structure of FIG. 32 taken in the Z-Y plane. The four electrodes shown can be drivgn with sine waves or square waves. To obtain the vertical electric field and thus, the "vertical" stable configuration, we connect electrodes 501 and 504 together and 503 and 502 together and adjust the phases, $\phi$, as shown in FIG. 33.

FIG. 34, shows the same electrode structure as shown in FIG. 33, but a mixture of vertical and transverse fields are generated by connecting electrodes 501 and 504 together and 502 and 503 together and adjusting the phases, $\phi$, to the values shown in FIG. 34.

For the phase pattern of the fields shown in FIG. 33 we utilize low frequency fields and for the phase pattern of the fields shown in FIG. 34, we utilize high frequency fields. The electric fields produced by the arrangement shown in FIG. 33 provide that the bulk liquid crystal material will be in a lower energy state if the directors are perpendicular to the ZY plane, i.e., parallel to the X-axis. This causes a torque to rotate the liquid crystal molecules and hence, the directors to form the "horizontal" stable configuration.

Another, and probably preferred arrangement, is to apply fields to the electrode configuration as shown in FIG. 35. The phase at electrode 501 is zero, the phase at electrode 504 is $\pi/2$, the phase at electrode 503 is $3\pi/2$, and the phase at electrode 502 is $\pi$. At the center of the cell the field is a continuously rotating circularly poarized electric field in the Z-Y plane, whereas at other positions in the cell it is elliptically polarized in the Z-Y plane. This rotation is shown by arrow 550 in FIG. 35. At any given location X, Y, Z the field is constantly changing between $E_Y$ and $E_Z$. Therefore, the average torque will be such as to align the liquid crystal molecule in the X direction perpendicular to the ZY plane. The field must rotate at a rate exceeding the dielectric response time to avoid unwanted molecular motion. That is, the molecules should see a rms field whose average value in the Z-Y plane is isotropic to prevent the molecules from ever becoming parallel to the Z-Y plane. In addition the rotating field must encompass as much of the space between substrates as possible. This means that the electrode width must be small compared to their spacing.

The discussion above assumed that the embodiments had substantial untwisted alignment configurations. However, as a consequence of the fact that the elastic moduli, $k_{22} < k_{33}$, $k_{11}$ in most liquid crystal materials, it is advantageous, under some circumstances, for the directors to undergo twist, in lieu of or in addition to, splay-bend alignments. Therefore, twisted alignment configurations are included in the embodiments of all the aforementioned tilted-boundary condition alignments.

The specific circumstances under which twisted or untwisted configurations may predominate are governed both by the liquid crystal material properties and by the boundary tilt. In particular, a high tilt from a normal to the substrate surface favors twist deformations which have a lower energy content than large bend deformations and a low tilt favors bend deformations which involve a lower energy content than a large twist deformation. In general, there exists a critical boundary tilt angle $\theta_c$ above which twist configurations are stable and below which untwisted configurations are stable, with the two states identical at $\theta_c$. This $\theta_c$ depends on the elastic moduli of the particular liquid crystal material. For the $k_1 = k_3 = 2k_2$ approximation that describes many nematic materials, $\theta_c = 58.7$ degrees. For the elastic parameters presently available for E7 mixtures, $\theta_c \simeq 66$ degrees from normal. Thus, tilt angles exceeding 66 degrees will promote stable twist configurations in E7, while angles less than 66 degrees should theoretically favor planar vertical states.

Several important considerations are needed. First, it is important to recognize that the two states-untwisted and twisted states—under discussion are topologically equivalent to each other, but distinct from the untwisted horizontal state. The arrows signifying director lines point alternately into and away from the opposite substrates in the former two, while they always point into (or away from) both substrates in the latter. Secondly, as $\theta \rightarrow \theta_c$ in either the untwisted or twisted configurations, the twist configurations will become more indistinguishable from a true vertical (untwisted) configuration. This is essential in terms of optical differentiability when pleochroic dyes are incorporated for contrast.

The existence of even a small misalignment of boundary tilt azimuths in the nominally planar structures described hereinabove has a pronounced effect on $\theta_c$ and thus, the character of the stable configuration—twisted or untwisted. Specifically, misalignment tends to reduce $\theta_c$, making a twist configuration increasingly probable at a fixed boundary tilt. Indeed, a twisted structure, described hereinbelow, naturally promotes twisted nonplanar configurations and breaks the degeneracy that permits opposite twist domains to exist.

At this point we note that further embodiments of the present invention may be formed by rotating one of the substrates relative to the other about a normal to the substrate planes. This causes the stable configurations to include twists. The stable configurations, however, still retain the property of requiring movement of disclinations, through the bulk of the liquid crystal material, along the substrate surfaces, or by a combination of both movements in order to switch.

These embodiments once again form "vertical" and "horizontal" stable configurations.

We have found that in some of these twisted substrate embodiments, such as 90 degrees twist, it is preferred to add some liquid crystal material in the cholesteric mesophase to the nematic material in order to properly bias the twist at the substrate boundary.

The manufacture and optical differentiability are similar to that described above with respect to the substantially two-dimensional structures.

CELL TERMINATION

Figure 36:
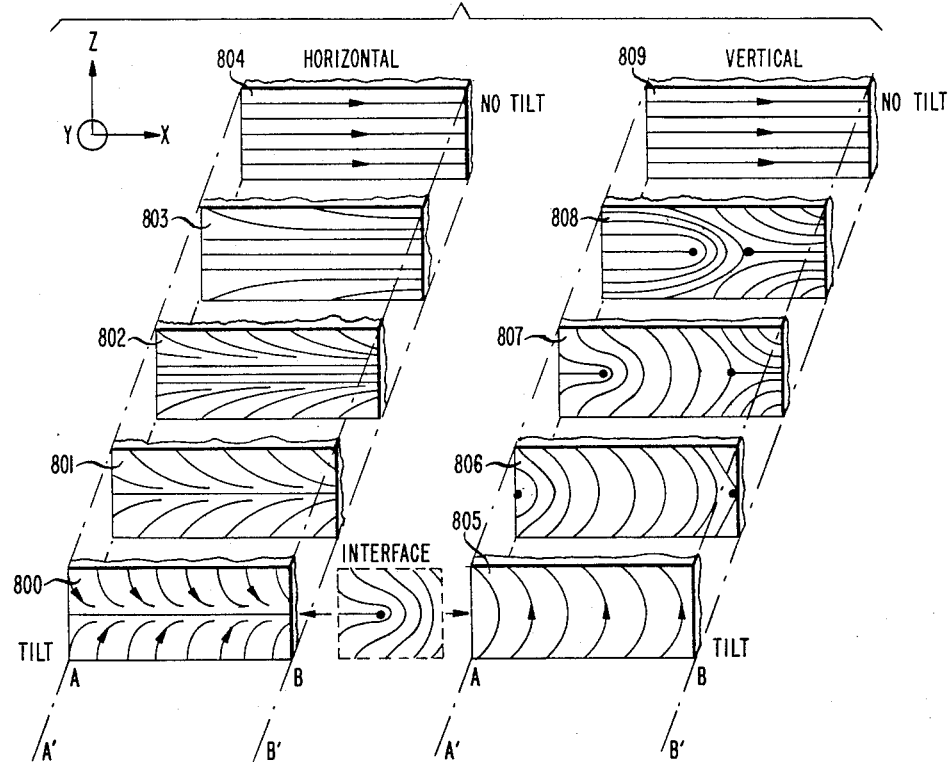
FIG. 36 shows, in diagrammatic form, the transition of stable configurations in a "single-tilt geometry" embodiment to a cell termination boundary having horizontal director alignments.

It should be clear to those skilled in the art that the liquid crystal cells having stable configurations can be used as cells in display devices. For good stability of the cell, the boundary which consists of liquid crystal material, see FIG. 2, must have the following property: "a transition from the director alignment configuration established in the interior of the cell to that configuration corresponding to the director alignment required to meet the termination boundary condition necessitates the detachment of disclinations. It is also important that the boundary condition matching for both of the "vertical" and "horizontal" stable configurations in a bistable device involve the detachment of disclinations. If this was not required, the transition of director alignments from one of the stable configurations in the interior body of the cell to the boundary would be continuous, i.e., without the existence of discliantions, and the transition of director alignments from the other stable configuration in the body of the cell would not be continuous. The result of this asymmetry would be that one stable configuration would gradually destabilize the other configuration. The problem with an asymmetric boundary condition is illustrated in FIG. 36, where 800-804 represent cross sections, parallel to the Z-X plane, of a rectangular cell for an untwisted "single-tilt geometry" embodiment. Plane 800 shows a cross section in the middle of the cell and plane 804 shows a cross section at the boundary of the cell. Note that the transition of the director alignment configuration in the "horizontal" stable configuration at the middle of the cell, shown in plane 800, to the director alignment configuration at the cell boundary, shown in plane 804, does not require formation of disclinations. Plane 805 shows a cross section in the middle of the cell and plane 809 shows a cross section at the boundary of the cell. Note that the transition of the director alignment configuration in the "vertical" stable configuration at the middle of the cell, shown in plane 804, to the director alignment configuration at the cell boundary, shown in plane 809, requires disclinations. Thus, the "horizontal" stable configuration will gradually destabilize the "vertical" stable configuration for a cell boundary condition which produces the horizontal director alignments shown in planes 804 and 809. A similar argument for a vertical director alignment at the cell boundary again shows a non-ideal cell termination condition. Note, however, that we still would have metastable configurations if we used these boundary conditions because we estimate that the time for complete destabilization along a one cm stripe would be on the order of an hour.

Figure 37:
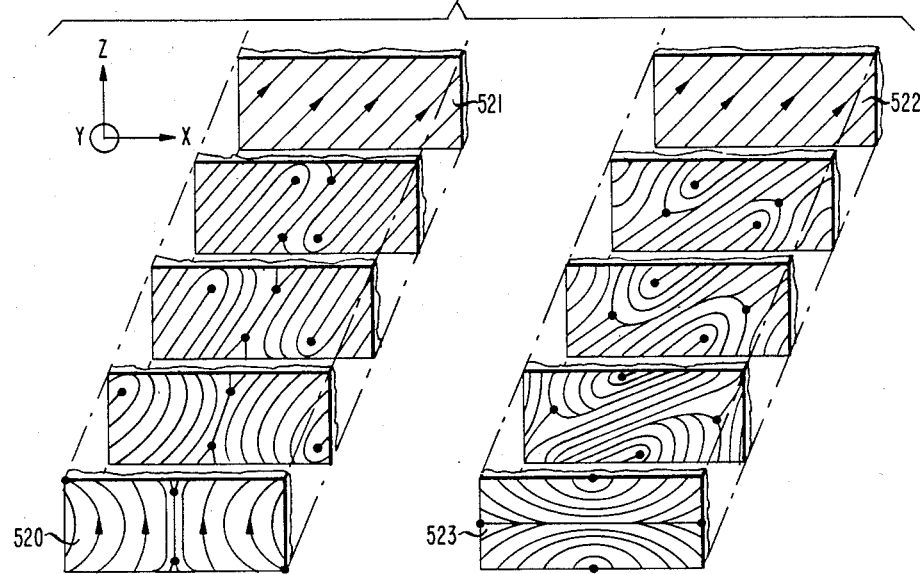
FIG. 37 shows, in diagrammatic form, the transition of stable configurations in a "alternating-tilt geometry" embodiment to a cell termination boundary having tilted director alignments.

FIG. 37 shows an embodiment of a cell termination boundary condition which is preferred over the simple horizontal or vertical director alignments discussed above. Plane 520 shows a cross section of the middle of a rectangular cell in the "vertical" stable configuration for an untwisted "alternating-tilt geometry" embodiment and plane 523 shows a cross section of the middle of the rectangular cell in the "horizontal" stable configuration. (This preferred cell termination boundary condition can be applied equally as well to the "single-tilt geometry" embodiment but we disclose its application to the "alternating-tilt geometry" embodiment for ease of description.) Planes 521 and 522 show cross sections of the rectangular cell at the boundary for the preferred cell termination director alignment condition embodiment. FIG. 37 shows that the transition of the director alignment configuration for a stable configuration in the middle of the cell to the director alignment configuration at the cell boundary consists of disclination-pinned textures for both stable configurations. Thus, this particular filt boundary alignment condition embodiment is not likely to favor one stable configuration more than the other. In fact, because it favors neither, the stable configurations are unlikely to destabilize one another.

Figure 38:
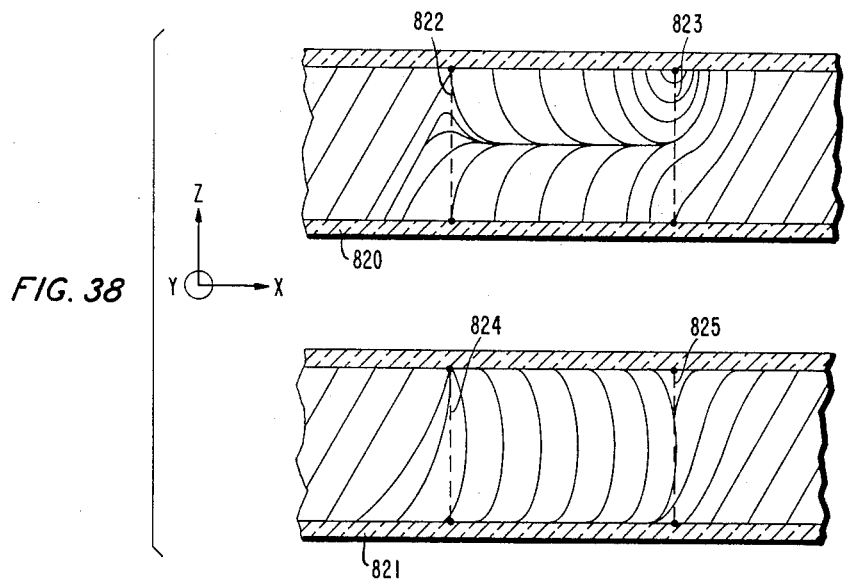
FIG. 38 shows, in diagrammatic form, a cross section of the present invention in a "single-tilt geometry" wherein the "horizontal" and "vertical" stable configurations are displayed in conjunction with a cell boundary having tilted director alignments.

FIG. 38 shows a planar cross section, parallel to the Z-X plane, taken through the middle of a liquid crystal cell for an untwisted "single-tilt geometry" embodiment. Dotted lines 822–825 represent the cell termination boundaries for planes parallel to the Z-Y plane. Planes 820 and 821 show, for the "single-tilt geometry" embodiment, how the preferred cell boundary alignment achieves stability at cell boundaries which are perpendicular to the cell boundaries shown in FIG. 37.

SWITCHING TIME

Switching between stable configurations requires a discontinuous change in director alignment and thus, necessitates the detachment and movement of disclinations. On a homogeneous surface, such as is illustrated by the "single-tilt geometry" embodiment shown in FIG. 12, this can only occur at the cell boundaries or at local surface defects where the existence of disclinations is most likely to occur. The detached disclination assumes the form of a line separating the regions in the "vertical" and "horizontal" stable configurations. The disclination moves under the influence of a vertical or transverse field. Switching is complete when the disclination has been reattached at an adjacent pinning site.

Figure 39:
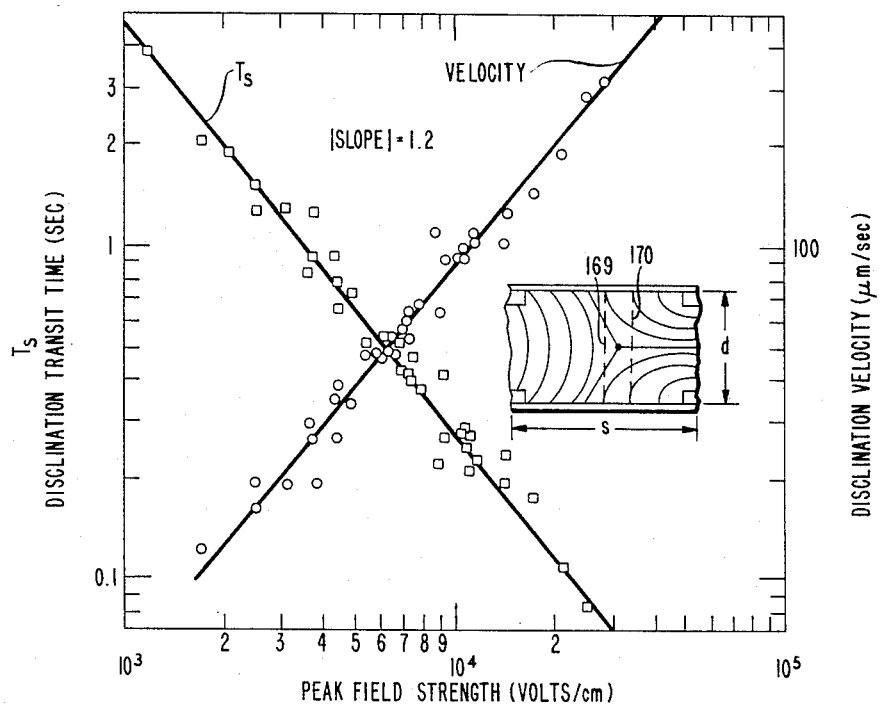
FIG. 39 shows experimental results of disclination velocity and approximate switching time between stable configurations for the "single-tilt geometry" embodiment shown in FIG. 12 both as a function of voltage applied to the electrode and the distance between electrodes.

In FIG. 39 we disclose experimental results for transit times of a wall which encompasses a disclination. The wall is defined shown in FIG. 39, for an untwisted "single tilt geometry" embodiment to be the volume contained between dotted lines 169 and 170. We measured the wall velocity by using a transverse magnetic field of up to 10K Gauss to switch to the "horizontal" stable configuration and a vertical electric field to switch to the "vertical" stable configuration.

Data taken for the "horizontal" to "vertical" transition for voltages up to 150 volts is shown in FIG. 39 for cells having a thickness $d = 50$ $\mu$m. The driving force for the transition is the difference in effective dielectric tensor or capacitance on either side of the well, which difference decreases inversely with applied field. We found an approximately constant wall mobility $\mu$ of $2.5 \times 10^{-6}$ cm$^2$/volt-sec for fields with coherence length $\leq d$.

Theoretically, the switching time for a cell is approximately equal to the time $t_T$ required for the wall to transit a distance S, so that $t_T = S/\mu E$ where $E = V_o/d$ is the field strength at voltage $V_o$. Thus, fast switching requires a small electrode distance S. For example, with $S = d = 25$ $\mu$m, $t_T$ is 50 msec at $V_o = 70$ volts peak (50 v rms).

Figure 40:
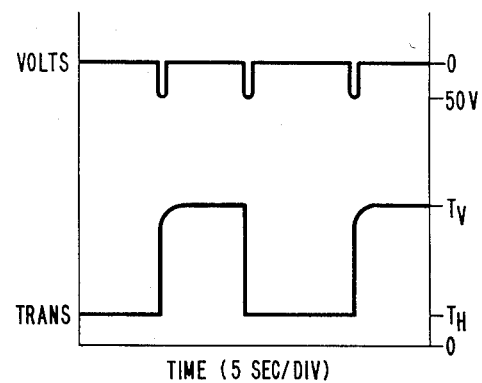
FIG. 40 shows the relative optical transmission of the "alternating-tilt geometry" embodiment shown in FIG. 7.
Figure 41:
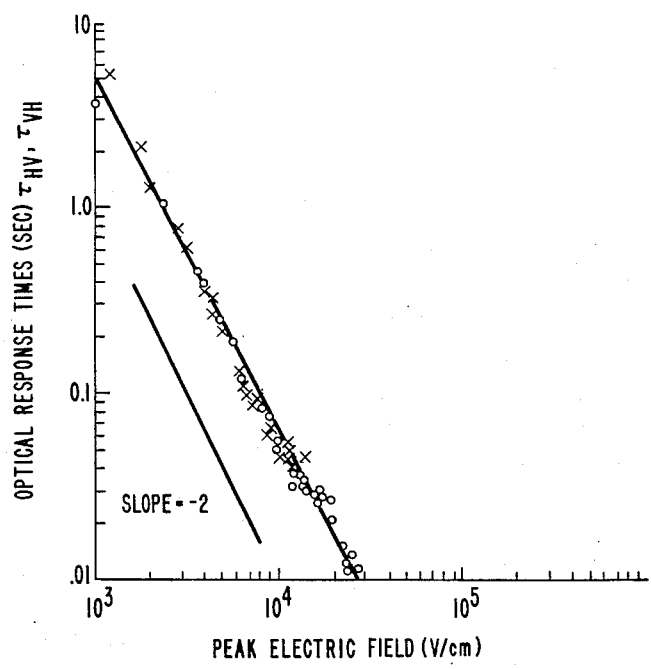
FIG. 41 shows the transit time for the switching of the "alternating-tilt geometry" embodiment shown in FIG. 7.

The optical rise time of an "alternating-tilt geometry" cell is quite fast. This fact is shown in FIG. 40. This optical rise time shown in FIG. 40, however, reflects only the response time of molecular rotation and not the movement of disclinations which are required for making the configuration stable. A truer measure of the switching time for a cell is the transit time $t_T$ of the disclinations. Since $t_T = dS/\mu V$, where d is the distance between the substrates, S is the distance between the electrodes, $\mu$ is the high field wall mobility and V is the applied voltage, a transit time of 0.1 sec should be theoretically possible with $S = d = 25$ $\mu$m and $V = 40$ volts peak. FIG. 41 illustrates the transit time for a cyanobiphenyl mixture with $\mu = 2.5 \times 10^{-6}$ cm$^2$/V-sec across 25 $\mu$m wide regions.

ELECTRODE CONFIGURATION

Figure 42:
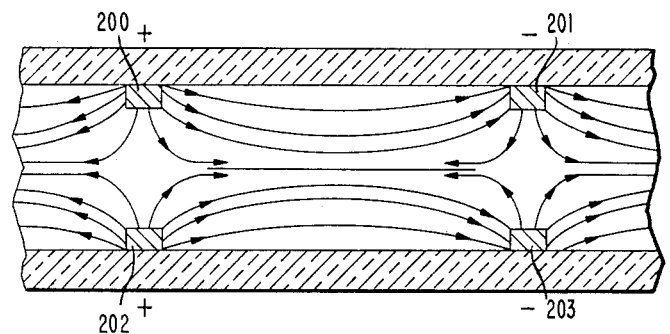
FIGS. 42-43 show a diagrammatic cross section of the field lines produced by an electrode arrangement suitable for switching between stable configurations for the "single-tilt geometry" embodiment shown in FIG. 12.

In FIG. 42 we show the electric field lines and polarity of electrodes in a condition that will switch a cell from the "vertical" to the "horizontal" stable configuration.

Figure 43:
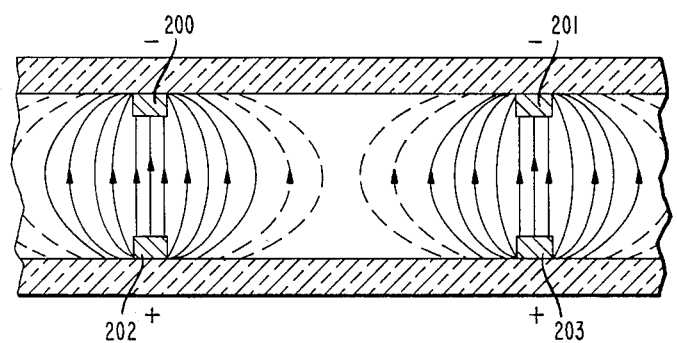

In FIG. 43 we show the electric field lines and polarity of electrodes in a condition which will switch a cell from the "horizontal" to the "vertical" stable configuration.

Figure 44:
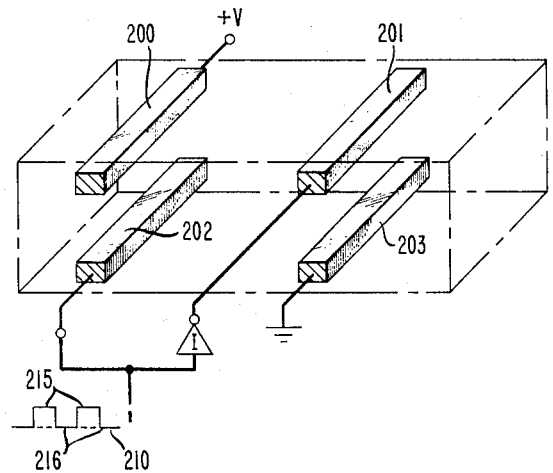
FIG. 44 shows, in schematic diagram form, a wave form and an electrode arrangement for switching between stable configurations for the "single-tilt geometry" shown in FIG. 12.

In FIG. 44 we show electrodes 200–203 with a schematic diagram of a circuit for generating the appropriate polarities shown in FIGS. 42 and 43. It should be clear to those skilled in the art as to how pulse stream 210, shown in FIG. 44, generates the appropriate polarities when applied to the circuit illustrated in FIG. 44. We note that pulse areas 215 switch to the "horizontal" and pulse areas 216 switch to the "vertical" stable configurations.

We claim:

1. A mechanically bistable liquid crystal cell comprising a liquid crystal material having orientational directors disposed between a first substrate surface of a first substrate and a second substrate surface of a second substrate, said first substrate surface and second substrate surface being substantially planar and parallel to each other, said liquid crystal material being mainly in the nematic mesophase;

characterized in that said first and second substrate surfaces being fabricated such that the directors adjacent to each surface are parallel aligned and the alignments alternate from a positive angle to a negative angle with respect to a normal to each substrate surface, which normal points into said liquid crystal material, the angle being between 22.5 and 67.5 degrees;

the boundary provided by said first and second substrate surfaces contains at least two singular points of orientational alignment in a plane perpendicular to said substrate surfaces where said alignments alternate from a positive angle to a negative angle, one of said two singular points serving as the source of a disclination which can be moved by an externally applied field and the other one of said two singular points serving as the point at which the disclination can be pinned after it has completed its movement.

2. The liquid crystal cell as defined in claim 1 wherein boundaries between said adjacent regions on said first and said second substrate surfaces are substantially straight lines.

3. The liquid crystal cell as defined in claim 2 wherein said substantially straight line boundaries on said first substrate surface are substantially parallel and said substantially straight line boundaries on said second substrate surface are substantially parallel.

4. The liquid crystal cell as defined in claim 3 wherein said substantially straight line boundaries on said first substrate surface are substantially parallel to said substantially straight line boundaries on said second substrate surface.

5. The liquid crystal cell as defined in claim 4 wherein the distance between said substantially straight line boundaries on said first substrate are substantially the same and the distance between said substantially straight line boundaries on said second substrate surface are substantially the same.

6. The liquid crystal cell as defined in claim 5 wherein the distance between said substantially straight line boundaries on said first substrate surface is substantially equal to the distance between said substantially straight line boundaries on said second substrate surface.

7. The liquid crystal cell as defined in claim 6 wherein said first and second substrates are aligned such that said regions having directors aligned at a positive angle on said first substrate surface lie substantially above said regions having directors aligned at a negative angle on said second substrate surface.

8. The liquid crystal cell as defined in claim 7 wherein the substrates are aligned up such that said regions having directors aligned at a positive angle on said first substrate surface lie substantially above said regions having directors aligned at a positive angle on said second substrate surface.

9. The liquid crystal cell as defined in claim 6 further characterized in that said liquid crystal material includes a pleochroic dye.

10. The liquid crystal cell as defined in claim 3 wherein said substantially straight line boundaries on said first substrate surface are substantially nonparallel to said substantially straight line boundaries on said second substrate surface.

11. The liquid crystal cell as defined in claim 10 further characterized in that said liquid crystal material includes liquid crystal material in the cholesteric mesophase.

12. A mechanically bistable liquid crystal cell comprising a liquid crystal material having orientational directors disposed between a first substrate surface of a first substrate and a second substrate surface of a second substrate, said liquid crystal material being mainly in the nematic mesophase;
characterized in that
adjacent regions of said first and second substrate surfaces are alternately tilted, such that the intersection of both surfaces with a plane substantially perpendicular to each surface is a line having a saw-tooth pattern;
said first and second substrate surfaces being fabricated such that the directors in each of said adjacent regions of said first and second substrate surfaces are aligned substantially perpendicular to their respective regions.

13. A mechanical bistable liquid crystal cell as defined in claim 12 wherein said first and second substrate surfaces are treated with a surfactant in order to align the directors substantially perpendicular to their respective regions.

14. The liquid crystal cell as defined in claim 12 wherein boundaries between said adjacent regions on said first and said second substrate surfaces are substantially straight lines.

15. The liquid crystal cell as defined in claim 14 wherein said substantially straight line boundaries on said first substrate surface are substantially parallel and said substantially straight line boundaries on said second substrate surface are substantially parallel.

16. The liquid crystal cell as defined in claim 15 wherein said substantially straight line boundaries on said first surface are substantially parallel to said substantially straight line boundaries on said second substrate surface.

17. The liquid crystal cell as defined in claim 16 wherein the distance between said substantially straight line boundaries on said first substrate surface are substantially the same and the distance between said substantially straight line boundaries on said second substrate surface are substantially the same.

18. The liquid crystal cell as defined in claim 17 wherein the distance between said substantially straight line boundaries on said first substrate surface is substantially the same as the distance between said substantially straight line boundaries on said second substrate surface.

19. The liquid crystal cell as defined in claim 18 wherein said first and second substrates are aligned such that said regions having a normal tilted at a positive angle on said first substrate surface lie substantially above said regions having a normal tilted at a negative angle on said second substrate surface.

20. The liquid crystal cell as defined in claim 19 further characterized in that said liquid crystal material includes a pleochroic dye.

21. The liquid crystal cell as defined in claim 15 wherein said substantially straight line boundaries on said first substrate surface are substantially nonparallel to said substantially straight line boundaries on said second substrate surface.

22. The liquid crystal cell as defined in claim 21 further characterized in that said liquid crystal material includes liquid crystal material in the cholesteric mesophase.

23. A mechanically bistable liquid crystal cell comprising a liquid crystal material having orientational directors disposed between a first substrate surface of a first substrate and a second substrate surface of a second substrate, said first substrate surface and said second substrate surface being substantially planar and parallel to each other, said liquid crystal material being mainly in the nematic mesophase;
characterized in that
said first substrate surface is fabricated such that the directors adjacent to said first substrate surface are parallel aligned at a first angle which is positive with respect to a normal to said substrate surface, which normal points into said liquid crystal material;

said second substrate surface is fabricated such that said directors adjacent to said second substrate surface are parallel aligned at a second angle which is negative with respect to a normal to said second substrate surface, which normal points into said liquid crystal material;

said first angle and said second angle being between 22.5 and 67.5 degrees;

the cell further includes surface dscontinuities disposed adjacent to said first substrate surface and said second substrate surface for detaching and reattaching disclinations in said liquid crystal material at at least two points.

24. The liquid crystal material as defined in claim 23 wherein the direction of a straight line formed by the intersection of a plane parallel to the director alignment at said first substrate surface and said first substrate surface is substantially parallel to the direction of a straight line formed by the intersection of a plane parallel to the director alignment at said second substrate surface and said second substrate surface.

25. The liquid crystal cell as defined in claim 24 further characterized in that said liquid crystal material includes a pleochroic dye.

26. The liquid crystal cell as claimed in claim 24 wherein the direction of a straight line formed by the intersection of a plane parallel to the director alignment at said first substrate surface and said first substrate surface is substantially nonparallel to the direction of a straight line formed by the intersection of a plane parallel to the director alignment at said second substrate surface and said second substrate surface.

27. The liquid crystal cell as defined in claim 26 further characterized in that said liquid crystal material includes liquid crystal material in the cholesteric mesophase.

* * * * *